US008923688B2

(12) United States Patent
Aggarwal et al.

(10) Patent No.: US 8,923,688 B2
(45) Date of Patent: Dec. 30, 2014

(54) PERFORMING PERSONAL VIDEO RECORDING (PVR) FUNCTIONS ON DIGITAL VIDEO STREAMS

(75) Inventors: Gaurav Aggarwal, Bangalore (IN); Arun Gopalakrishna Rao, Bangalore (IN); Marcus Kellerman, Aliso Viejo, CA (US); David Erickson, Estival, SC (US); Jason Demas, Irvine, CA (US); Sandeep Bhatia, Bangalore (IN); Girish Hulmani, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 2806 days.

(21) Appl. No.: 10/318,295

(22) Filed: Dec. 11, 2002

(65) Prior Publication Data

US 2003/0169815 A1     Sep. 11, 2003

Related U.S. Application Data

(63) Continuation-in-part of application No. 09/951,693, filed on Sep. 12, 2001, now abandoned.

(60) Provisional application No. 60/426,903, filed on Nov. 15, 2002.

(51) Int. Cl.
*H04N 5/783* (2006.01)
*H04N 21/4385* (2011.01)
(Continued)

(52) U.S. Cl.
CPC ..... *H04N 21/4385* (2013.01); *H04N 19/00781* (2013.01); *H04N 21/6587* (2013.01); *H04N 21/2387* (2013.01); *H04N 19/00218* (2013.01); *H04N 19/00569* (2013.01); *H04N 19/00715* (2013.01); *G06T 9/004* (2013.01); *H04N 21/4147* (2013.01); *H04N 21/4331* (2013.01); *H04N 21/44004* (2013.01); *H04N 21/8455* (2013.01)
USPC ........... 386/347; 386/345; 386/348; 386/356; 375/240.05; 375/240.07; 375/240.12

(58) Field of Classification Search
CPC ............... H04N 19/00781; H04N 21/6587; H04N 21/2387; H04N 19/00218; H04N 19/00569; H04N 19/00715; G06T 9/004
USPC ........... 375/240.12, 240.05, 240.07; 386/347, 386/348, 345, 356
See application file for complete search history.

(56) References Cited

U.S. PATENT DOCUMENTS 5,805,762 A * 9/1998 Boyce et al. ............... 386/68
6,243,495 B1 * 6/2001 Naveen et al. ............. 382/236
(Continued)

OTHER PUBLICATIONS

Susie J. Wee and Bhaskaran Vasudev, Compressed-Domain Reverse Play of MPEG Video Streams, Nov. 1998, SPIE International Symposium on Voice, Video and Data Communications, Boston, MA.*

*Primary Examiner* — Hoang-Vu A Nguyen-Ba
(74) *Attorney, Agent, or Firm* — Foley & Lardner LLP; Christopher J. McKenna; Helen H. Zhang

(57) ABSTRACT

Presented herein are systems, methods, and apparatus for improving performance of video decoders during rewind and fast forward operation. Video decoder performance is improved by avoiding repetitive decoding of prediction pictures. When a decoded prediction picture is stored in a frame buffer, techniques are presented for decoding multiple pictures in the rewind order which are dependent thereon, displaying the picture directly from the frame buffer, and setting one type of prediction picture as another type of prediction picture.

13 Claims, 24 Drawing Sheets

(51) Int. Cl.
  *H04N 19/61* (2014.01)
  *H04N 21/6587* (2011.01)
  *H04N 21/2387* (2011.01)
  *H04N 19/159* (2014.01)
  *H04N 19/50* (2014.01)
  *H04N 19/51* (2014.01)
  *G06T 9/00* (2006.01)
  *H04N 21/4147* (2011.01)
  *H04N 21/433* (2011.01)
  *H04N 21/44* (2011.01)
  *H04N 21/845* (2011.01)
  *H04N 5/917* (2006.01)
  *H04N 11/02* (2006.01)

(56) References Cited

U.S. PATENT DOCUMENTS

| | | | |
|---|---|---|---|
| 6,295,089 B1 * | 9/2001 | Hoang | 348/390.1 |
| 6,317,136 B1 * | 11/2001 | Choi | 345/537 |
| 6,334,026 B1 * | 12/2001 | Xue et al. | 386/98 |
| 6,363,212 B1 * | 3/2002 | Fujinami et al. | 386/104 |
| 6,510,554 B1 * | 1/2003 | Gordon et al. | 725/90 |
| 6,804,449 B1 * | 10/2004 | Desai | 386/344 |
| 6,980,594 B2 * | 12/2005 | Wang et al. | 375/240.12 |
| 7,224,730 B2 * | 5/2007 | Kim et al. | 375/240.08 |
| 8,559,797 B2 * | 10/2013 | MacInnis | 386/345 |
| 2005/0053300 A1 * | 3/2005 | Mukerjee | 382/239 |
| 2008/0037952 A1 * | 2/2008 | Nallur et al. | 386/68 |

\* cited by examiner

PERFORMING PERSONAL VIDEO RECORDING (PVR) FUNCTIONS ON DIGITAL VIDEO STREAMS

RELATED APPLICATIONS

This application is a continuation-in-part of U.S. patent application Ser. No. 09/951,693, filed Sep. 11, 2001 now abandoned and entitled "COMMAND PACKETS FOR PERSONAL VIDEO RECORDER" by Demas et. al., which is incorporated by reference herein.

This application also claims priority from Provisional Application Ser. No. 60/426,903, filed Nov. 15, 2002, by Kellerman, et. al., which is incorporated by reference herein.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to video recorder and playback systems, and more particularly to controlling the presentation of content.

Television (TV) content distribution is quickly migrating from analog formats to compressed digital formats. Currently, distribution of digital video content for TV display is dominated by use of the MPEG-2 video compression standard (ISO/IEC 13818-2). MPEG-2 and its predecessor MPEG-1 define the standards to compress video content using a combination of various techniques. An MPEG-encoded stream may have three types of pictures, Intra-coded (I), Predicted (P) and Bi-directionally predicted (B). I-pictures are not compressed using any temporal predictions and can be decoded without the need of any other picture. The P-pictures perform temporal predictions from a picture that comes before it in the display order. Thus, decode of a P-pictures requires one picture (from the past) to be available with the decoder for performing temporal predictions. This prediction picture may be either an I-picture or another P-picture. The B-pictures are bi-directionally predicted and, hence, use two pictures for prediction, one from the past and another from the future (in display order).

During normal decode of MPEG streams, video decoders store the last two decompressed I/P pictures in memory. The last I/P picture is used for predicting an incoming P-picture and the last two I/P pictures are used for predicting an incoming B-picture. During a Rewind operation, the pictures have to be displayed in the reverse order. The video stream is itself fed to the decoder through a system that first recorded the stream on a recordable media such as a hard-disk. A Rewind operation is complex because B-pictures cannot be decoded from the previously decoded pictures in the rewind order. Rather, the last two prediction pictures in the forward decode order are needed by the decoder in order to decode a B-picture.

The foregoing can be accomplished by decoding pictures in the forward picture order starting from the last I-picture before the B-picture in the forward decoding order. Thus, an existing decoder has to decode multiple pictures for displaying a single picture. If such a decoder is unable to decode multiple pictures in the given time limit for getting ready with a new picture for display, then the video quality suffers.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

Presented herein are systems, methods, and apparatus for improving performance of video decoders during rewind and fast forward operation. Video decoder performance is improved by avoiding repetitive decoding of prediction pictures. When a decoded prediction picture is stored in a frame buffer, techniques are presented for decoding multiple pictures in the rewind order which are dependent thereon, displaying the picture directly from the frame buffer, and setting one type of prediction picture as another type of prediction picture.

In one embodiment, multiple pictures that are dependent on a prediction picture are decoded in rewind order. During a rewind operation, the prediction pictures for displaying a picture to be displayed are decoded and stored in frame buffers. Each of the pictures that are dependent on the prediction pictures stored in the frame buffer are decoded and displayed in rewind order. The foregoing advantageously avoids repetitive decoding of the prediction pictures.

In another embodiment, a past prediction picture that is stored in a frame buffer for decoding a picture to be displayed is itself displayed if the prediction picture is the next picture in the rewind sequence. During a rewind operation, a past prediction picture is stored in frame buffer for decoding a picture to be displayed. If the past prediction picture is the next picture in the rewind sequence after the picture to be displayed, the past prediction pictures is displayed directly from the frame buffer. The foregoing advantageously avoids repetitive decoding of the past prediction picture.

In another embodiment, a reference picture that is stored in a frame buffer for decoding a picture to be displayed is itself displayed if the reference picture is the next picture in the rewind sequence. During a rewind operation, the reference picture is stored in a reference picture frame buffer for decoding a picture to be displayed. If the reference picture is the next picture in the rewind sequence after the picture to be displayed, the reference picture is displayed directly from the reference picture frame buffer. The foregoing advantageously avoids repetitive decoding of the reference picture.

In another embodiment, a future prediction picture that is stored in a frame buffer for decoding a picture to be displayed is itself displayed if the future prediction picture is the next picture in the fast forward sequence. During a fast forward sequence, the future prediction picture is stored in a future prediction frame buffer for decoding a picture to be displayed. If the future prediction picture is the next picture in the fast forward sequence after the picture to be displayed, the future prediction picture is displayed directly from the frame buffer. The foregoing advantageously avoids repetitive decoding of the future prediction picture.

In another embodiment, a future prediction picture is set as the past prediction picture. During fast forward operation, the future prediction picture is stored in a frame buffer for decoding the picture to be displayed. If the future prediction picture is the past prediction picture for the next picture to be displayed in the fast forward sequence, the future prediction picture is set as the past prediction picture. The foregoing advantageously avoids repetitive decoding of the prediction picture.

In another embodiment, the future prediction picture is set as the reference picture. During a fast forward operation, the future prediction picture is stored in a frame buffer for decoding the picture to be displayed. The future prediction picture can be stored as a reference picture for the next group of pictures to be displayed in the fast forward sequence.

These and other advantageous and novel features as well as details of illustrated embodiments will be more fully understood from the following description and drawings.

BRIEF DESCRIPTION OF SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

Figure 1:
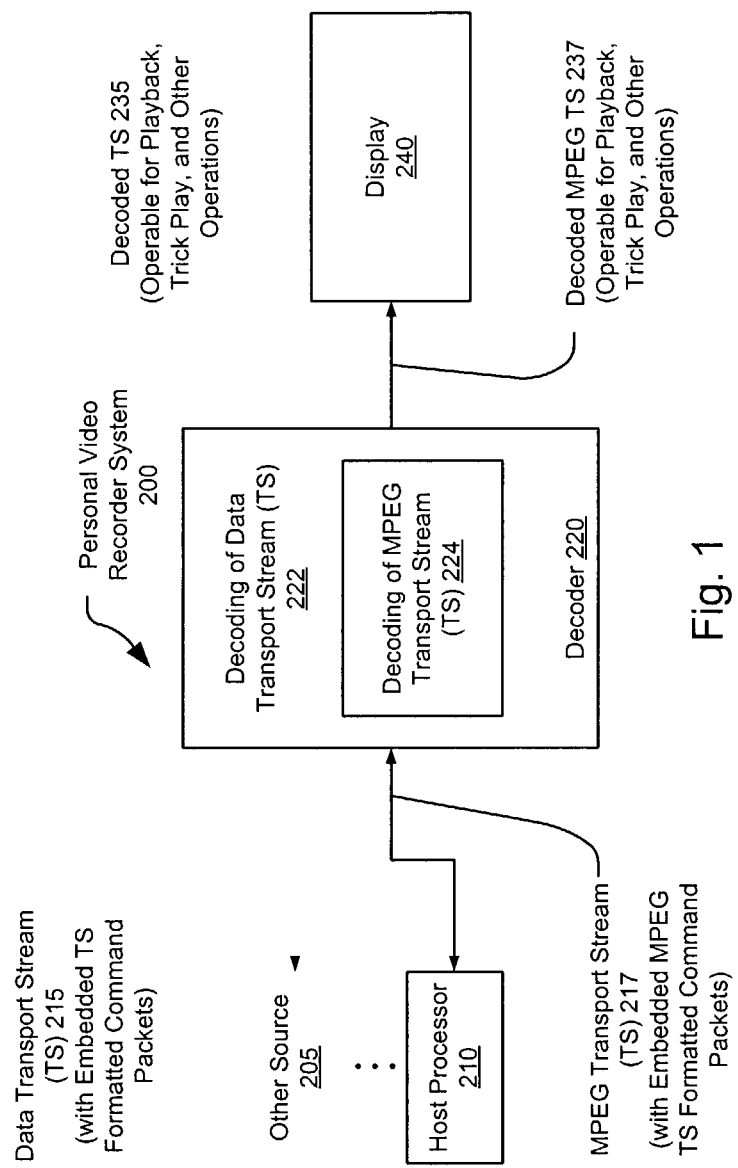
FIG. 1 is a system diagram illustrating an embodiment of a personal video recorder system that is built in accordance with certain aspects of the present invention.

The present invention is able to insert command packets directly into a motion picture expert group, MPEG-2 transport stream (TS). For simplicity, MPEG-2 TS will commonly be referred to as MPEG TS. The command packets may be formatted in a similar way in which data is also formatted to comply with the MPEG TS format. Aspects of the present invention are also operable, generically, to perform formatting of command packets into a TS format, so that they may be inserted within the TS, without affecting the ability of the TS to be received and decoded.

The location in which the command packet may be inserted into the TS may vary, as desired in the particular application. Certain embodiments of the present invention envision content management that may be performed by system up-stream from where the TS is generated. For example, a device may receive a TS, and based on analysis of the content of the TS, certain portions of the TS may be skipped, passed over, or otherwise handled differently based on the content of the data. For example, in some situations, content unsuitable for children may be detected and skipped over as desired by a user of certain aspects of the present invention. A parent could program their decoder to detect the data type in the TS and then to insert certain command packets into the TS so that the TS will be accommodated according to that parent's desires. If the parent wished to skip adult content completely, TS formatted command packets could be inserted to skip over adult-oriented content at all times. Conversely, other content-based management could similarly be performed.

For systems that are operable to decode the TS formatted command packet, the control functionality of the command packet is readily made available for use. Aspects of the present invention obviate the need for the communication and control intensive interfacing between a control device and a decoding device that is prevalent in previous systems. Any number of commands may be included within a TS formatted command packet. Aspects of the present invention obviate the need to implement trick play of data using proprietary techniques within previous systems. For example, rather than requiring the physical manipulation of the data into a form other than the ordinary form in which the data is received to enable trick play playback (as in previous systems), the present invention is operable to perform this functionality using the TS formatted command packets.

The TS formatted command packets are decoded in similar manner as the way an actual TS formatted data is decoded. Aspects of the present invention also enable backward compatibility to systems that are not operable to perform trick play functionality. For example, when a TS formatted command packet is received, as part of the TS formatted data, the receiver of the trick play incapable system simply rejects, or discards, the TS formatted command packet as if it were corrupted data. The data may alternatively be identified as being irrelevant data, and not necessarily corrupted. Aspects of the present invention provide the ability to do this without deleteriously affecting the performance of normal and ordinary playback of the data. No substantial jitter is introduced by the detection and discarding of this data.

Aspects of the present invention provide for a great decrease in the interfacing required between the device that provides the data and the device that actually decodes the data and provides it to an output device, and may also provide control commands of how the data is to be played back. Within many of the various exemplary embodiments, the use of video data is used for illustration. Any form of digital data may be included in various embodiments. Audio data, video data, and other digital data may be handled using various aspects of the present invention to format command packets into a format compatible with the manner in which actual data is formatted for transport. The transport of data, and TS formatted command packets, may be between two embedded components within a single device, between multiple devices, and generically between any two elements that data may be transported. The command packets may be inserted into the TS at virtually any point without corrupting the TS. From an overview perspective, the command packets appear similar to an ordinary data packet in form. However, when that packet is decoded, it contains command information that may include how other packets within the TS are to be handled. For a decoding system that is incapable to recognize or perform the proper functionality, the command packet simply appears to be corrupted data. In this situation, the command packet may alternatively be identified as being an irrelevant command packet, and not necessarily corrupted. In such situations, the command packet is ignored and discarded without affecting the playback of the other data portions of the TS.

In certain embodiments, aspects of the present invention are implemented in a personal video recorder (PVR) system. A personal video recorder system may offer consumers a hard disk-based VCR that is operable to receive and record a live TV program while offering the versatility of select playback and associated special features. The personal video recorder is also operable to receive data from any number of other sources as well.

A feature provides the ability to the consumer to pause viewing of a live broadcast, for a variable length of time while the unit continues to record, and then resume continuous view from the point of departure. This is often referred to as "time-shifting." In addition, since the programs are recorded digitally, the viewer can also take advantage of trick play features such as pause, fast forward, slow forward, rewind, slow reverse, skip, etc. Certain of these aspects, among others, are disclosed below in various embodiments of the present invention.

FIG. 1 is a system diagram illustrating an embodiment of a personal video recorder system 200 that is built in accordance with certain aspects of the present invention. The personal video recorder system 200 includes a decoder 220 that receives a data transport stream (TS) 215 from some source. The TS 215 may be received by the decoder 220 from a host processor 210, . . . , or any other source 205 without departing from the scope and spirit of the invention. The host processor 210 or the any other source 205 is the device that controls the playback (including trick play playback) of the data. The host processor 210 or the any other source 205 and the decoder 220 may be included within a single device or separate devices. The TS 215 contains embedded TS formatted command packets. From certain perspectives, the TS formatted command packets may be viewed as being command packets, having a form of an ordinary TS data packet in terms of configuration and arrangement, which are inserted within the TS 215. In certain embodiments, an MPEG TS 217, having embedded MPEG TS formatted command packets, is provided by either one or both of the host processor 215, . . . , or the any other source 205 to the decoder 220.

The decoder 220 is operable to perform decoding of the TS 215, as shown in a functional block 222 within the decoder 220. Similarly, the decoder 220 is operable to perform decoding of the MPEG TS 217, as shown in a functional block 224 within the decoder 220. The now decoded TS 235, is passed to an output device shown as a display 240. Again, other output devices may be employed to accommodate various data types, including audio data types. The use of a display 240 is used to show the exemplary situation of video data TSs. The display 240 is operable to perform playback of the now decoded TS 235. The decoded TS 235 may be of various data types, including audio and video data types.

The decoded TS 235 is now operable for playback, trick play, and other operations within the output device. In one particular situation, the decoded TS may be a decoded MPEG TS 237 that is operable for playback, trick play, and other operations. The command packets, which were formatted into the appropriate TS format within the TS 215, are decoded to direct the manner in which portion of the TS 215 are to be handled. The TS formatted command packets do not interfere with the remaining portions of the TS, in that they appear simply to be other packets within the TS in terms of format.

When the TS 215 is decoded, a system that is operable to perform trick play and that is operable to decode and extract the commands within the command packets, implements the commands to direct the appropriate handling of the other portions of the TS. However, if the system is incapable to provide the trick play functionality, then the command packets simply are identified as corrupted data and/or irrelevant data and discarded. Even conventional systems are operable to detect a corrupted data packet and/or irrelevant data packet. For systems incapable to perform the decoding and performance of the command contained within the TS formatted command packets, the TS formatted command packets do not substantially interfere with the normal playback of the TS. That is to say, in the context of video playback, there is not substantial interference with the playback of the video data such that a viewer perceives a substantial reduction in perceptual quality. Analogously, in the context of audio playback, there is not a substantial interference with the playback of the audio data such that a listener perceives a substantial reduction in perceptual quality.

Figure 2:
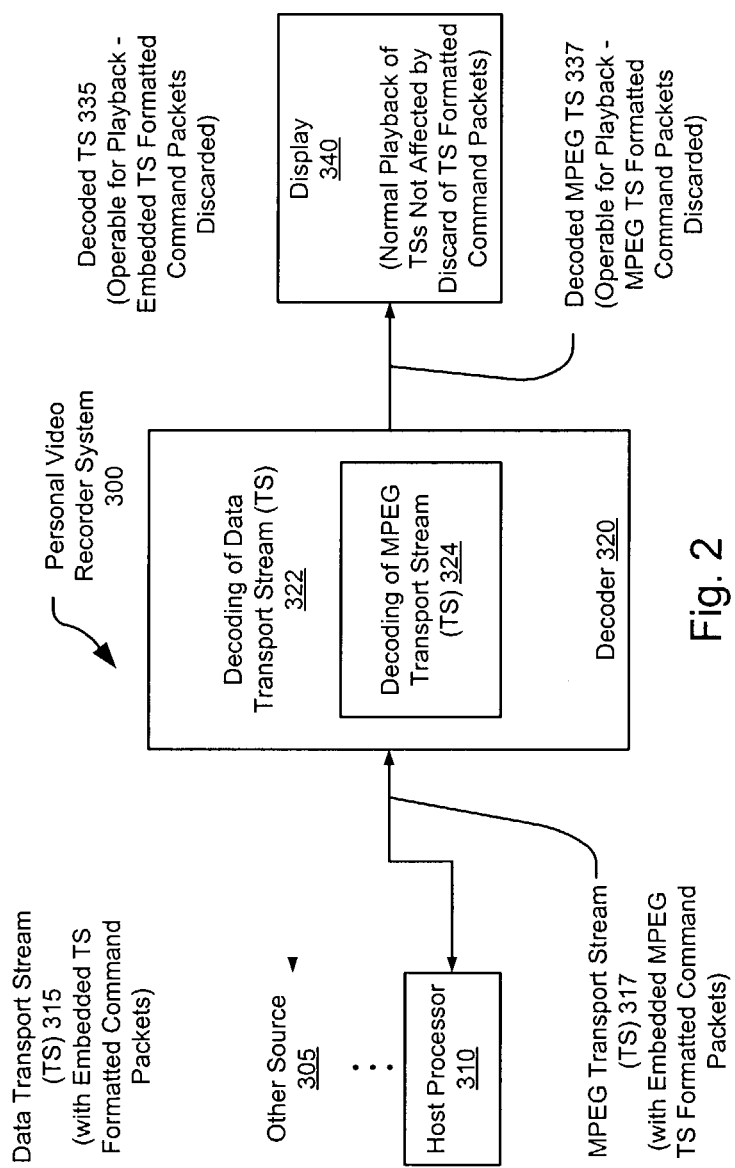
FIG. 2 is a system diagram illustrating another embodiment of a personal video recorder system that is built in accordance with certain aspects of the present invention.

FIG. 2 is a system diagram illustrating another embodiment of a personal video recorder system 300 that is built in accordance with certain aspects of the present invention. The personal video recorder system 300 includes a decoder 320 that receives a data transport stream (TS) 315 from some source. The TS 315 may be received by the decoder 320 from a host processor 315, ..., or any other source 305 without departing from the scope and spirit of the invention. The TS 315 contains embedded TS formatted command packets. From certain perspectives, the TS formatted command packets may be viewed as being command packets, having a form of an ordinary TS data packet in terms of configuration and arrangement, which are inserted within the TS 315. In certain embodiments, an MPEG TS 317, having embedded MPEG TS formatted command packets, is provided by either one or both of the host processor 315, ..., or the any other source 305 to the proprietary decoder 320.

The decoder 320 is operable to perform decoding of the TS 315, as shown in a functional block 322 within the decoder 320. Similarly, the decoder 320 is operable to perform decoding of the MPEG TS 317, as shown in a functional block 324 within the proprietary decoder 320. The now decoded TS 335, is passed to an output device shown as a display 340. Again, other output devices may be employed to accommodate various data types, including audio data types. The use of a display 340 is used to show the exemplary situation of video data TSs. The display 340 is operable to perform playback of the now decoded TS 335. The decoded TS 335 may be of various data types, including audio and video data types.

In this particular embodiment, the decoder 320 is inoperable to perform any trick play as directed by the commands within the TS formatted command packets. Alternatively, the decoder 320 is inoperable to perform decoding of the commands within the TS formatted command packets. In this situation, the now decoded TS 335 is operable for normal playback. Those TS formatted command packets, which were contained within the TS 315, are ignored and discarded. This ignoring and discarding does not interfere with the playback of the other portions of the decoded TS 335.

Figure 3:
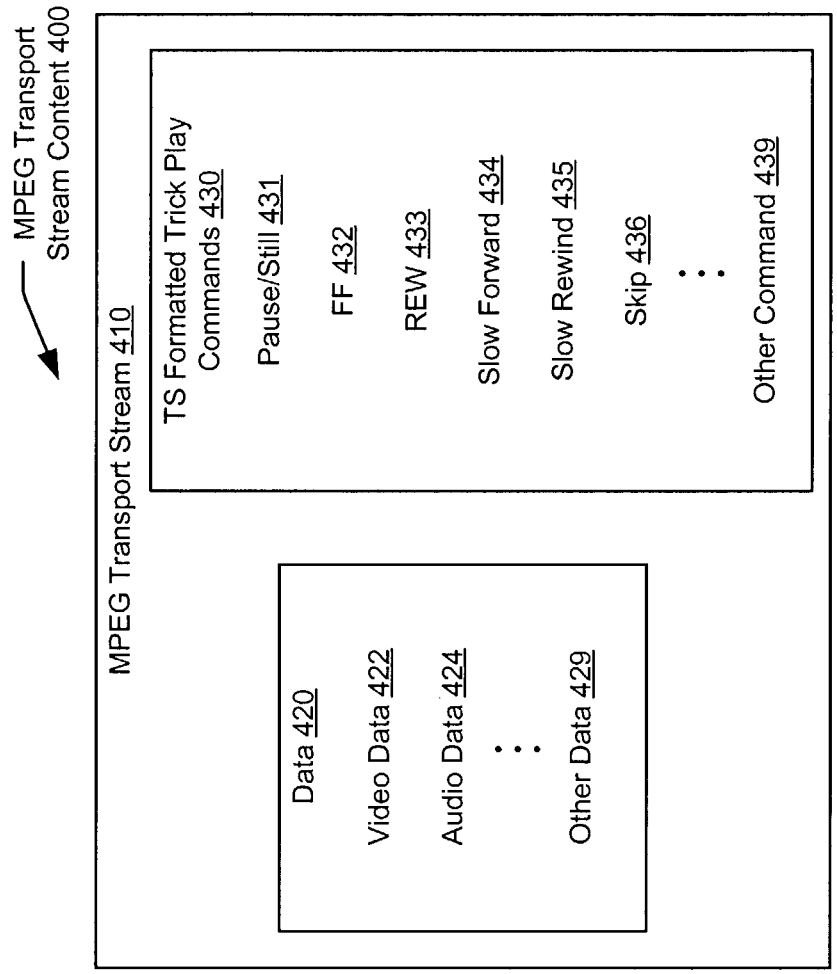
FIG. 3 is a system diagram illustrating an embodiment of motion picture expert group (MPEG) transport stream (TS) content that is configured in accordance with certain aspects of the present invention.

When the TS 315 is decoded, and given that the decoder 320 is inoperable to perform trick play and is operable to decode and to extract the commands within the TS formatted command packets, then the decoder 320 simply perceives that the TS formatted command packets are corrupted data and/or irrelevant data. The decoder 320 then discards the TS formatted command packets. This embodiment of the present invention, as shown in the FIG. 3, shows that even the decoder 320 is operable to receive and decode, and even to playback, a TS 315 that is encoded using certain aspects of the present invention including embedding TS formatted command packets into the TS 315. The TS formatted command packets do not substantially interfere with the normal playback of the TS. That is to say, in the context of video playback, there is not substantial interference with the playback of the video data such that a viewer perceives a substantial reduction in perceptual quality. Analogously, in the in the context of audio playback, there is not a substantial interference with the playback of the audio data such that a listener perceives a substantial reduction in perceptual quality.

This embodiment shows the backward compatibility of a TS that is encoded in accordance with certain aspects of the present invention. A system capable to perform decoding of the command packets, and also a system incapable to do so, may both receive a TS that is encoded using the present invention. Certain aspects of the present invention may be implemented in new and older systems without introducing any deleterious reduction in performance.

FIG. 3 is a system diagram illustrating an embodiment of motion picture expert group (MPEG) transport stream (TS) content 400 that is configured in accordance with certain aspects of the present invention. The MPEG TS content 400 includes an MPEG TS 410. The MPEG TS 410 includes data 420 and TS formatted trick play commands 430. The data 410 may include any one or combination of video data 422, audio data 424, ..., and any other data type 429. The TS formatted trick play commands 430 may include any one or a combination of commands that direct functions of pause/still 431, fast forward 432, rewind 433, slow forward 434, slow rewind 436, skip 436, ..., and any other commands 439. There may also be subsets of each of the command included within the TS formatted trick play commands 430. For example, the fast forward 432 may also include options to perform FF at varying rates, such as ½-x, 2x, 3x, etc. Similarly, the rewind 432 may also include options to perform REW at varying rates, such as ½-x, 2x, 3x, etc. The other command may also include other variations as well.

The data 420 within the MPEG TS 410 is formatted in a particular manner to enable and comply with MPEG TS formatting requirements. In addition, a command packet including any one or more of the TS formatted trick play commands 430 within the MPEG TS 410 are formatted in a particular manner to enable and comply with MPEG TS formatting requirements.

Moreover, certain aspects of the present invention are extendible to other variations as well. For example, other TS data formats may similarly benefit from the present invention. In other contexts, command packets may be formatted into a proper TS format and inserted within the TS as well. Certain embodiments of the present invention are geared specifically to accommodate MPEG TSs, but the principle of embedding command packets, where the command packets are formatted in a similar manner as data is formatted within the TS format, may be employed in other application contexts as well. The implementation of these aspects assist in the ability to eliminate a great deal of communication, command, and control interfacing between various components within personal video recorders and other systems that seek to perform decoding and presentation of data that is received via a TS.

Figure 4:
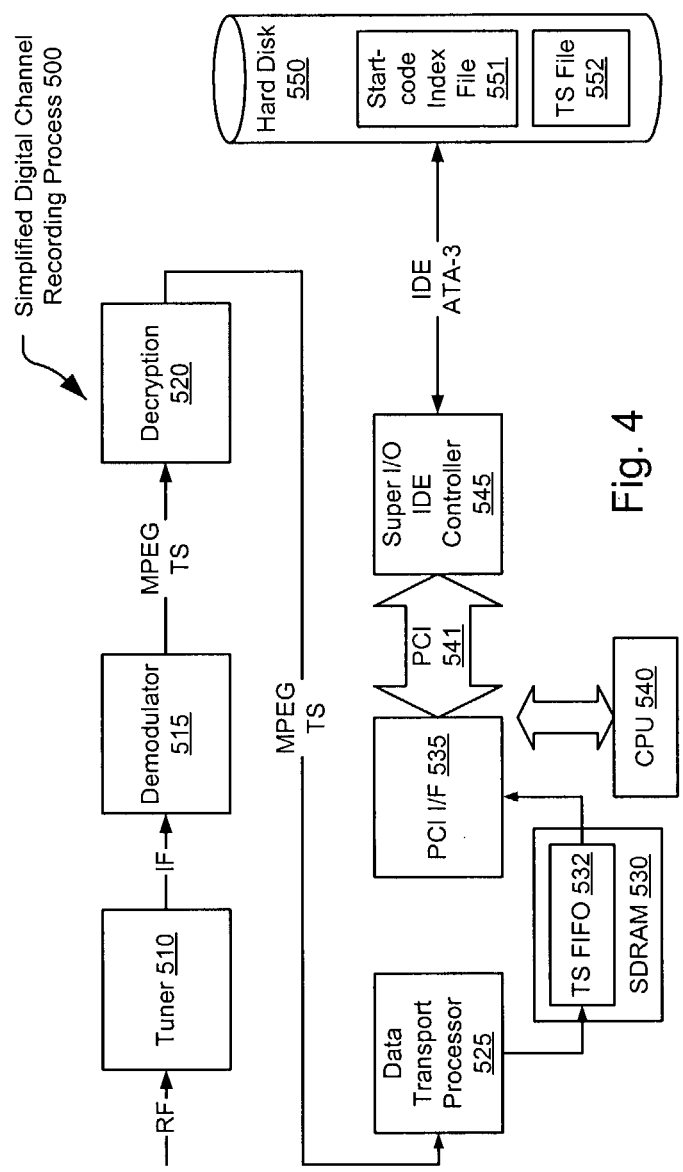
FIG. 4 is a system diagram illustrating an embodiment of a simplified digital channel recording process that is performed in accordance with certain aspects of the present invention.

FIG. 4 is a system diagram illustrating an embodiment of a simplified digital channel recording process 500 that is performed in accordance with certain aspects of the present invention. The FIG. 4 shows one embodiment where digital channel recording may be performed, in a simplified manner when compared to previous systems, using certain aspects of the present invention. The recording process of a digital video stream is given in the FIG. 1. In this embodiment, a personal video recorder (PVR) digital-channel-recording process can be described as shown below.

The selected video service will be contained in a transport stream (TS) that is received as shown in a radio frequency (RF) signal that is received by a tuner 510. The tuner 510 is operable to down-convert the channel that contains the transport stream, from RF to intermediate frequency (IF). The Demodulation block, shown as a demodulator 515, demodulates the IF to base-band digital data and outputs the transport stream (shown as an MPEG TS) and sends the data to the decryption block 520.

The decryption block 520 decrypt the packets of the TS into clear data if the service is authorized. This output TS stream goes to the Data Transport Processor 525. The Data Transport Processor selects the requested service and then re-multiplexes it into a new TS and stores the new TS data in a TS FIFO buffer 532 in synchronous dynamic random access memory (SDRAM) 530.

This new TS is then transferred to a hard disk 550. The data within the TS FIFO buffer 532 is operable to be communicates to the hard disk 550. The CPU 540 controls the storing of the data from the TS FIFO 532 to the hard drive (hard disk 550). This is done using DMA engines which send the data over the PCI bus 541 to the super I/O controller chip 545 containing the IDE interface to the hard drive (hard disk 550) itself. If desired, the IDE ATA-3 Advanced Technology Attachment Interface with Extensions—AT Attachment 3 Interface protocol is employed between the super I/O controller chip 545 and the hard disk 550. A Start Code Index Table (SCIT) 551 is also generated and stored in the hard disk 550 (see below for detailed description). A TS file 552 is then stored within the hard disk 552. This TS file 552 may include exclusively data portions and also command packet portions in various embodiments.

The embodiment of the present invention shown in the FIG. 4 shows how a TS may be generated and stored in a hard disk 550. When the TS file 552 may then be read from the hard disk 550, TS formatted command packets may then also be inserted within the TS stream that is extracted from the TS file 552. TS formatted command packets may be inserted into a TS at any time without compromising the quality of the data contained within the TS.

Figure 5:
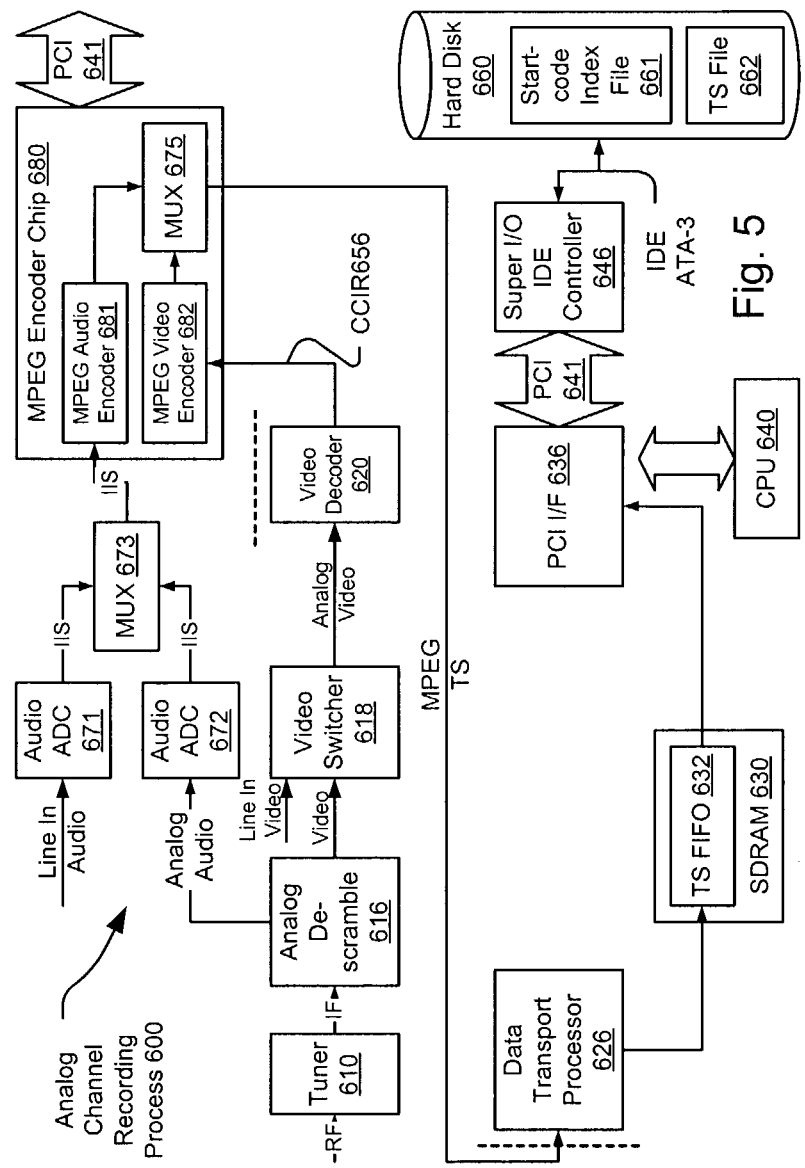
FIG. 5 is a system diagram illustrating an embodiment of an analog channel recording process that is performed in accordance with certain aspects of the present invention.

FIG. 5 is a system diagram illustrating an embodiment of an analog channel recording process 600 that is performed in accordance with certain aspects of the present invention. A personal video recorder can accept an analog channel from either the tuner or from the baseband line inputs on the back panel of its device.

The analog channel record path for each of these two cases may be described as shown below. A tuner 610 receives a radio frequency (RF) signal and down-converts the selected channel to an intermediate frequency (IF) signal. The IF signal is then passed to the analog descramble block 616. The analog descramble block 616 will then demodulate the IF to base-band analog video and audio. If the channel is encrypted, the analog descramble block 616 will also decrypt the signals (provided that it is authorized to do so). The video component from the analog descramble block 616 is passed to a video switcher block 618 from which an analog video signal is passed to a video decoder 620. The video switcher block 620 also receives a line in video signal as well. The analog audio signal, from the analog descramble block 616, is passed to an audio analog to digital converter (ADC) 672. Another audio ADC 671 is placed in parallel with the audio ADC 672; the audio ADC 671 receives a lien in audio signal. The outputs from both the audio ADCs 671 and 672 are provided as serial $I^2S$ data streams, which are compressed and multiplexed (using MUX 673) into a serial $I^2S$ data stream that is provided to an MPEG audio encoder block 681 within the MPEG encoder chip 680.

After the video component is then passed to the video decoder 620, the video decoder 620 converts it to an 8 bit parallel data stream that is then sent to an MPEG video encoder block 682 within an MPEG encoder chip 680. The MPEG encoder chip 680 accepts the digitized video (in CCIR656 format, if desired) and digitized audio (from the MUX 675) and compresses them and then multiplexes them (using a MUX 675) to an MPEG TS. The MPEG TS is a MPEG 2 Transport Stream in one particular embodiment. If desired, this now digitized MPEG TS may be communicated to other devices via a PCI bus 641. The MPEG TS is then passed to a data transport processor 626. The TS processing in the data transport processor 626 stores the data in a TS FIFO buffer 632 in a SDRAM 630. A CPU 640 controls storing the data from the TS FIFO 632 to the hard drive/hard drive 660. This may be performed using any one or more of various DMA engines that send the data over a PCI bus 641 (after having passed through a PCI I/F 636) to a super I/O controller chip 646 containing the IDE interface to the hard drive/hard disk 660 itself. Again, the interfacing between the super I/O controller chip 646 and the hard disk 660 may be performed using the IDE ATA-3 protocol. The start code index table (SCIT) is also generated and stored in the hard drive/hard disk 660. Ultimately, a TS file 662 is stored on the hard disk 660. The TS file 662 may then be retrieved for playback or for transmission to other components or devices.

The embodiment of the present invention shown in the FIG. 4 shows how a TS may be generated and stored in a hard disk 660. When the TS file 662 is then be read from the hard disk 660, TS formatted command packets may then also be inserted within the TS stream that is extracted from the TS file 662. TS formatted command packets may be inserted into a TS at any time without compromising the quality of the data contained within the TS.

Figure 6:
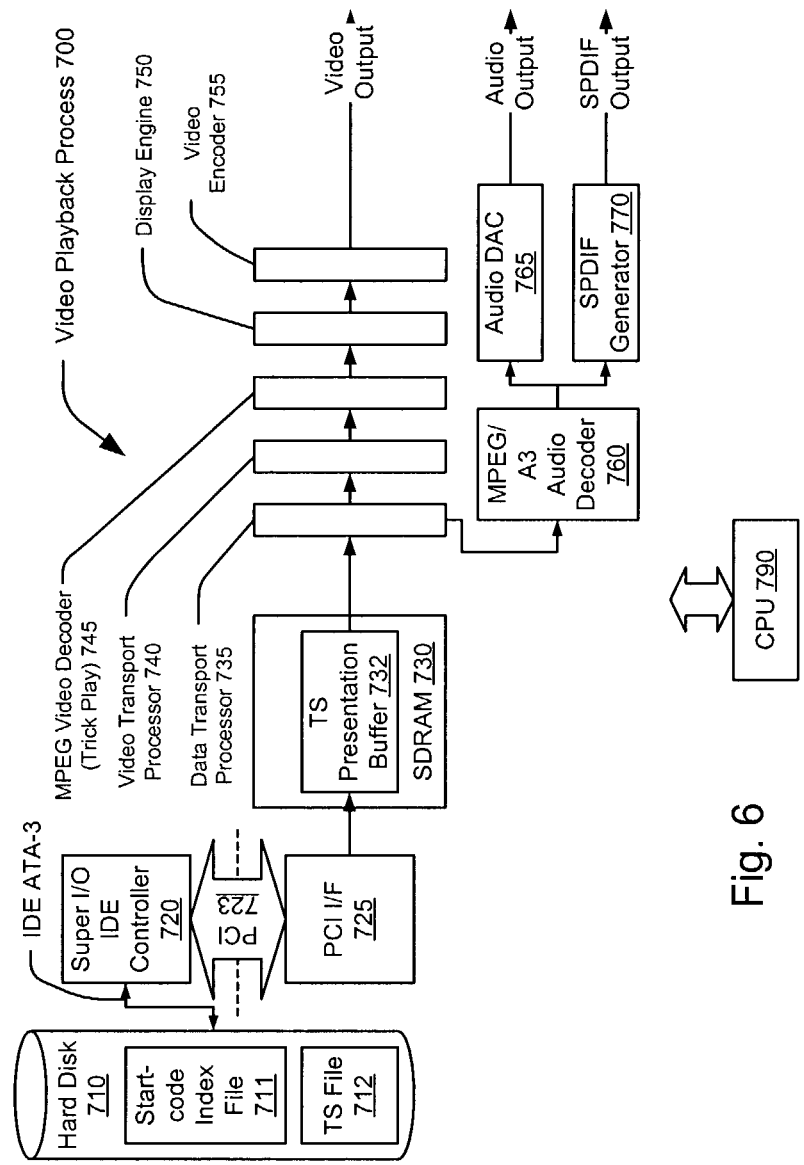
FIG. 6 is a system diagram illustrating an embodiment of a video playback process that is performed in accordance with certain aspects of the present invention.

FIG. 6 is a system diagram illustrating an embodiment of a video playback process 700 that is performed in accordance with certain aspects of the present invention. The particular example of video data retrieval and playback is shown in the FIG. 6, but these aspects of the present invention are also extendible to retrieval and playback of other types of data, including audio data and other digital data types.

For a program recorded on the hard drive/hard disk 710, a personal video recorder, or other operable system, can play back that program using the steps described below in the system diagram of the FIG. 6. A processor, that may include a CPU 790, reads the TS data (shown as the TS file 712) from the hard drive/hard disk 710 based on the user selected playback mode. The correct TS data (from the TS file 712 within the hard drive/hard disk 710) is read into TS presentation buffer 732 within a SDRAM 730 using DMA engines.

Data may be read from the hard drive/hard disk 710 in a manner similar to the manner in which data is written into the hard drive/hard disk 710. A super I/O controller chip 720 may communicatively couple with the hard disk 710 and perform data transfer using the IDE ATA-3 protocol. The super I/O controller chip 720 then communicatively couples to the TS presentation buffer 732 within the SDRAM 730 via a PCI bus 723 and a PCI I/F 725. The data is output from the TS presentation buffer 732 and is then passed to a data transport processor 735. The data transport processor then de-multiplexes the TS into its PES constituents and passes the audio TS to an audio decoder 760 and the video TS to a video transport processor 740 and then to a MPEG video decoder 745 that is operable to decode and extract embedded, TS formatted command packets, that may include instructions to perform trick play functionality. The audio data is then sent to the output blocks, and the video is sent to a display engine 750. The display engine 750 is responsible for and operable to perform scaling the video picture, rendering the graphics, and constructing the complete display among other functions. Once the display is ready to be presented, it is passed to a video encoder 755 where it is converted to analog video using an internal digital to analog converter (DAC). The digital audio is converted to analog in the audio digital to analog converter (DAC) 765 while a SONY PHILIPS Digital Inter-Face (SPDIF) output stream is also generated and transmitted.

The FIG. 6 shows just one embodiment where a digital signal may be retrieved from a hard disk and transformed for playback. Any number of TS formatted command packets, contained within the TS file 712 as it is stored in the hard disk 710, or that are inserted into the TS during its transport throughout a personal video recorder or a video playback system, may also be used. An MPEG video decoder, such as the MPEG video decoder 745, that is operable to decode, interpret, and perform the commands included within the TS may perform the directed functions without necessitating the large degree of command and control interfacing that is required in previous systems. The ability to include commands, within TS formatted command packets within a TS, eliminates a great deal of interfacing and also greatly reduces the real estate consumption within a system that performs such functions. Again, if the decoder is inoperable to decode these TS formatted command packets, then they are simply identified as corrupted data within the TS and ignored and discarded. Clearly, these TS formatted command packets may alternatively be identified as being irrelevant data within the TS and ignored and may also be discarded.

Figure 7:
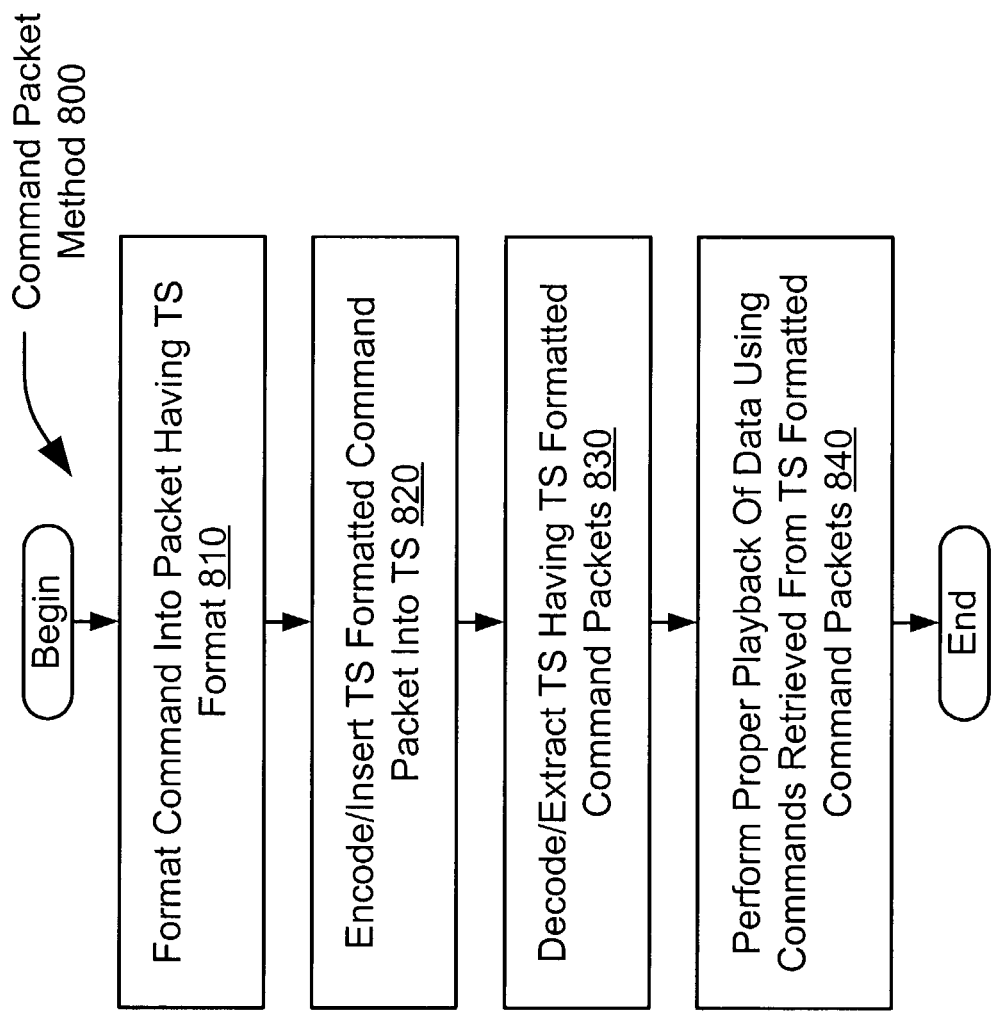
FIG. 7 is a functional block diagram illustrating an embodiment of a command packet method that is performed in accordance with certain aspects of the present invention.

FIG. 7 is a functional block diagram illustrating an embodiment of a command packet method 800 that is performed in accordance with certain aspects of the present invention. In a block 810, a command is formatted into a packet having a TS format. Then, the TS formatted command packet is encoded/inserted into the TS in a block 820. Various decisions may be used to determine where particularly the TS formatted command packet(s) is/are to be inserted within the TS. Then, in a block 830, the TS (having the TS formatted command packets) is decoded where the commands within the TS formatted command packets are extracted. In a block 840, the appropriate playback is performed using the commands that were retrieved from the TS formatted command packets.

Very generically, the embodiment of the present invention shown in the FIG. 7 shows how commands may be formatted into TS format, then inserted or encoded into a TS. Then, during the decoding of the TS, those previously encoded commands may be extracted during the decoding of the various packets of the TS. Aspects of the present invention enable adaptation of encoding commands, including trick play commands, into MPEG TS format and then insertion of those TS formatted command packets commands into an MPEG TS. The TS formatted command packets may include information on how to handle the entirety of the data within the TS, or portions of data within the TS. A number of TS formatted command packets may be included within a given TS and various portions of data within the TS may be handled differently. For example, normal playback may be performed on one portion, fast forward (FF) may be performed on another portion, rewind (REW) may be performed on yet another portion, and so on. By embedding commands within the TS itself, using certain aspects of the present invention, a great deal of interfacing between various components may be greatly reduced.

Figure 8:
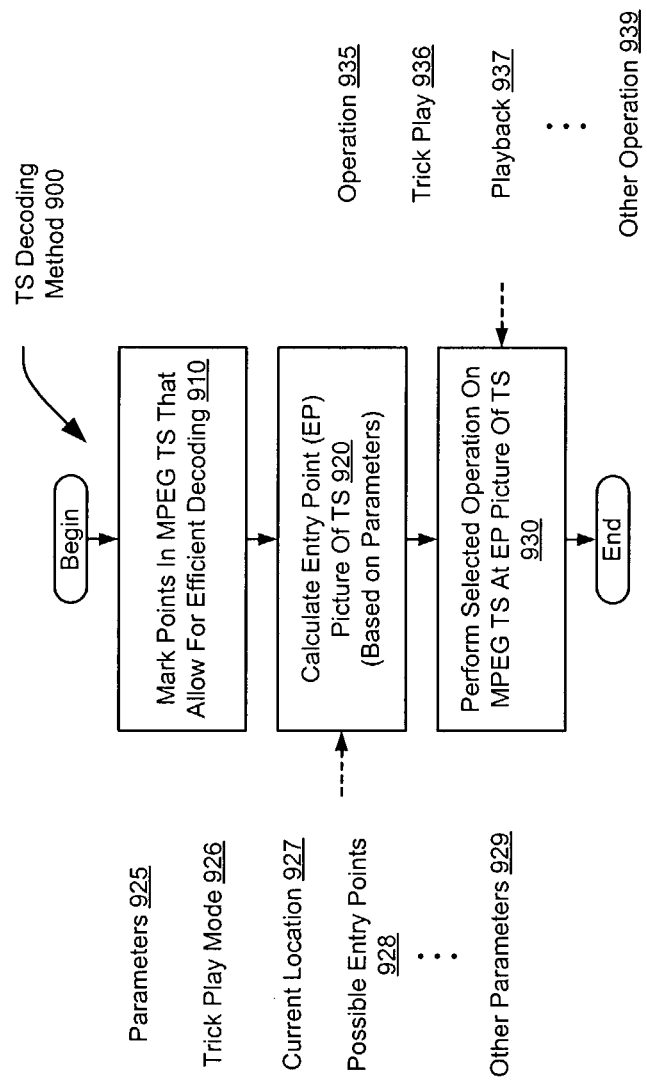
FIG. 8 is a functional block diagram illustrating an embodiment of a transport stream (TS) decoding method that is performed in accordance with certain aspects of the present invention.

FIG. 8 is a functional block diagram illustrating an embodiment of a transport stream (TS) decoding method 900 that is performed in accordance with certain aspects of the present invention. In a block 910, points within an MPEG TS are marked to allow for efficient decoding of the TS. The TS has one or more TS formatted command packets contained within it. Then, in a block 920, an entry point (EP) picture of the TS is calculated based on certain parameters of the TS. As shown in a block 925, certain of the parameters 925 may include parameters indicating a trick play mode 926, a current location 927, a number of possible entry points 928, ..., and any other parameter 929 that may be desired in a particular application.

Then, in a block 930, the selected operation, as provided within a TS formatted command packet contained within the TS, is performed on the MPEG TS at the EP picture of the TS. The various operations 935 may include any number of operations as described here and in other embodiments of the present invention. For example, the operations 935 may include operations such as trick play 936, playback 937, ..., and any other operation 939 that may be desired in a particular application.

As shown in this particular embodiment, a command may be included within a TS, as a TS formatted command packet, and the decoded command packet may be used to govern the handling of portions of the TS. In addition, the EP picture may be calculated at any desired point within the TS, as governed by the use and consideration of one or more of the parameters 925.

From other perspectives, in order to support trick-play modes on playback, a decoder randomly accesses the recorded TS that has been stored on a hard drive. The decoder also maintains its real time display by limiting the data transferred to only those data that are required for building the pictures corresponding to the selected trick-play mode. One way to achieve this is to mark certain entry points in the stream that would efficiently allow a complete picture to be decoded (as shown in the block 910). The CPU could then compute the next entry point of the stream based on the current trick-play mode, its current location, and the set of possible entry points (as shown in the block 920). Then, the appropriate operation may be performed on portions of the TS (as shown in the block 930).

Also, it will be appreciated that various command operations may be associated with various portions of the TS. As mentioned above in various embodiments, normal playback may be performed on one portion, fast forward (FF) may be performed on another portion, rewind (REW) may be performed on yet another portion, and so on.

The structure of the TS formatted command packets may take on various forms without departing from the scope and spirit of the invention. Any format where the command packets may be formatted so that they may be inserted within the TS and transported in a similar manner to that which the TS is communicated. Aspects of the present invention enable adaptation to MPEG-2 TS formats as well other TS formats where command packets are encoded into TS formatted command packets, so that the command may be extracted when the TS formatted command packet is decoded.

One embodiment of the structure and organization of a MPEG-2 TS formatted command packet (as included within an MPEG-2 TS) that may be employed in a personal video recorder or other system, is described below as follows:

The collection of data points that include entry points for a video stream forms a Start Code Index Table (SCIT), and the SCIT is stored in the hard drive in a recording processes (see FIGS. 5 and 6 for two possible embodiments). The SCIT provides important information about the location of the non-slice start codes (including the PES Start codes), and the first slice code following a non-slice start code in a record buffer. More specifically, the SCIT contains the following fields:
1. The start code value (SCV)
2. Two bytes following the start code value (SCV): The two bytes following the slice start code can be used to check the intra_slice and intra_slice_flag fields to determine the entry point picture. In a Progressive Refresh MPEG-2 bit stream (see Appendix for definition), pictures that have the first row (slice) as Intra are deemed to be the Entry Point (EP) pictures. The CPU uses the pointer of the first slice of every picture and inspects the data in the Elementary Stream. The format of the elementary stream is as follows:

```
{
    slice_start_code                             32 bits
    quantiser_scale_code                         5 bits
    if(nextbits( ) == '1'){
        intra_slice_flag                         1 bit
        intra_slice                              1 bit
        reserved_bits                            7 bits
        while(nextbits( ) == '1') {
            extra_bit_slice /* value of 1 */     1 bit
            extra_information_slice              8 bits
        }
    }
    extra_bit_slice /* value of 0 */             1 bit
    ...
```

The CPU then inspects the field intra_slice_flag. If it is found to be set, the next field intra slice is inspected. If that is found to be a '1', then the slice is deemed to be an intra slice. If the first slice is found to be an intra Slice, this picture is marked as an Entry point picture. If the intra_slice_flag is zero, or intra_slice is zero, then this slice is not an intra slice and hence this picture is not an Entry Point picture.

3. Packet offset: This gives the offset in bytes of the first zero byte of a start code pattern 00 00 01 SCV from the start of that packet.
4. Record count: Record count gives the number of bytes from the start of this record session to the start of the transport packet containing the start code for this entry. A count of zero indicates the first byte in this session.
5. Flag to indicate if any packets were dropped
6. Flag to indicate if any continuity counter error was detected
7. Flag to indicate if the transport error indicator was set in one of the recorded packets (MPEG)
8. Flag to indicate if a start code index entry was dropped due to internal buffer overflow
9. Flag to indicate if the previous PES packet had an error in its length Note: If the SCV reads a value of 0xFE, then the rest of the fields give the PTS values not the ones mentioned above.

An SCIT can be described by the following table, for example. The range of values M1, M2 . . . can be between 0 and 187 corresponding to size of the TS packet.

| SCV | Packet Offset | Record Count | Entry Picture | | | | | |
|---|---|---|---|---|---|---|---|---|
| E0 | M1 | N1 | NO | ... | ... | ... | ... | ... |
| B3 | M2 | N2 | NO | ... | ... | ... | ... | ... |
| B8 | M3 | N3 | NO | ... | ... | ... | ... | ... |
| 00 | M4 | N4 | NO | ... | ... | ... | ... | ... |
| ... | ... | ... | ... | ... | ... | ... | ... | ... |
| ... | ... | ... | ... | ... | ... | ... | ... | ... |
| 01 | M6 | N6 | YES | ... | ... | ... | ... | ... |
| 00 | M7 | N7 | NO | ... | ... | ... | ... | ... |
| ... | ... | ... | ... | ... | ... | ... | ... | ... |
| ... | ... | ... | ... | ... | ... | ... | ... | ... |
| 01 | M10 | N10 | NO | ... | ... | ... | ... | ... |
| 00 | M11 | N11 | NO | ... | ... | ... | ... | ... |
| ... | ... | ... | ... | ... | ... | ... | ... | ... |
| ... | ... | ... | ... | ... | ... | ... | ... | ... |
| 01 | M14 | N14 | NO | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| 00 | M48 | N48 | NO | ... | ... | ... | ... | ... |
| ... | ... | ... | ... | ... | ... | ... | ... | ... |
| ... | ... | ... | ... | ... | ... | ... | ... | ... |
| 01 | M50 | N50 | YES | ... | ... | ... | ... | ... |
| ... | ... | ... | ... | ... | ... | ... | ... | ... |
| ... | ... | ... | ... | ... | ... | ... | ... | ... |

It is also noted that the CPU picks the SCIT and linearizes the addresses as it writes to the hard disk. The packet offset and the record count points to the start code in the record life.

Figure 9:
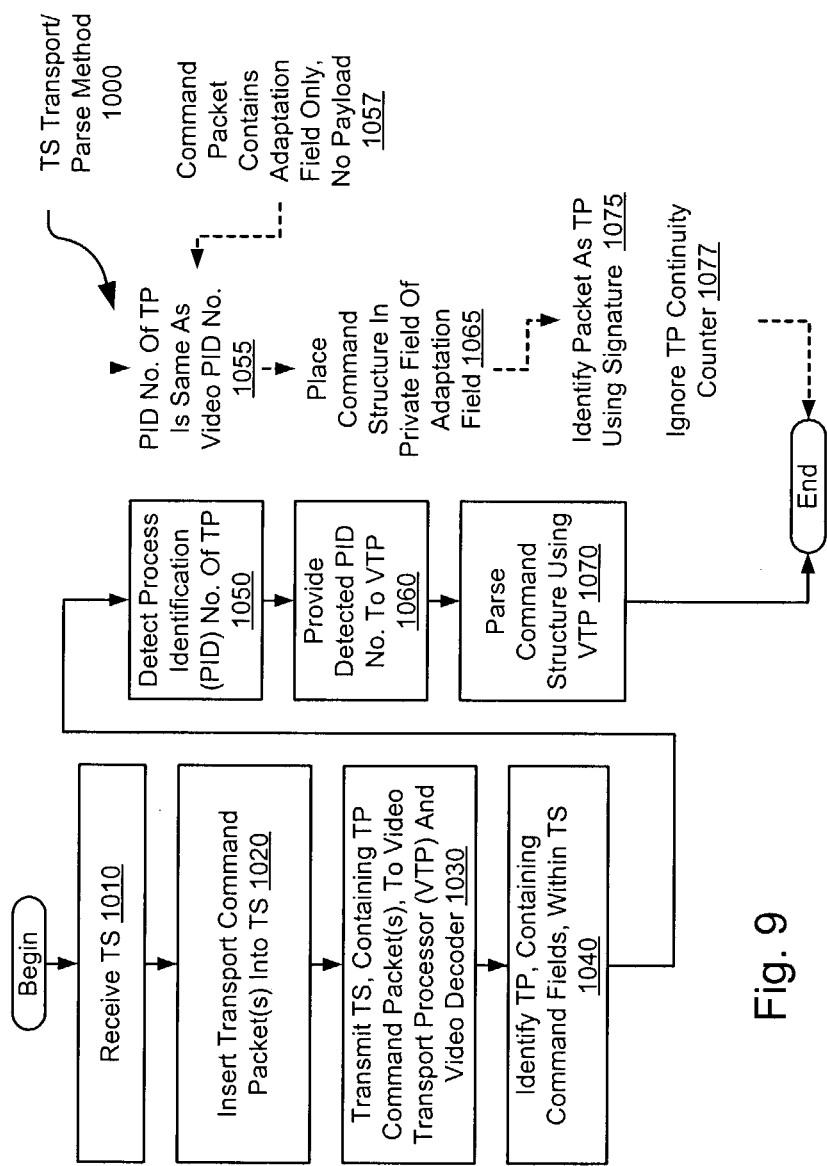
FIG. 9 is a functional block diagram illustrating an embodiment of a transport stream (TS) transport/parse method that is performed in accordance with certain aspects of the present invention.

FIG. 9 is a functional block diagram illustrating an embodiment of a transport stream (TS) transport/parse method 1000 that is performed in accordance with certain aspects of the present invention. In a block 1010, a TS is received. This may include receipt of multiple packets within a TS or a single packet within a TS. Alternatively, the entirety of the TS may be received in the block 1010. From certain perspectives, a Data Transport driver (DTD), built in accordance with certain aspects of the present invention, is responsible for data flow of the stream to be played back through a Data Transport (and/or Video Transport) Processor. In a block 1020, the DTD will also insert a "Transport Packet" (TP) into the actual TRANSPORT STREAM; the TP may be viewed as being Transport Command Packet(s)—containing various commands. The TP may be referred to as another terminology for a TS formatted command packet as described in other of the various embodiments of the present invention. The terminology of a TP and a TS formatted command packet may be used interchangeably. Then, in a block 1030, the TS (that now contains the TS formatted command packet) is transmitted to a Video Transport Processor (VTP) and a Video decoder. Thereafter, in a block 1040, that TP (or TS formatted command packet) is then identified. There exist several options for uniquely identifying a type of packet from among a group of packets. Here, the TP/TS formatted command packet is identified using any of a number of methods. The "Transport Packet"/TS formatted command packet that contains the command fields.

There exist a number of options in which to parse the command structure of a TP/TS formatted command packet. Two particular embodiments are described in the FIG. 9.

A first option:

In a block 1050, the process identification (PID) number of the TP/TS formatted command packet is identified. If desired, a CPU indicates the PID number of the TP. Then, in a block 1060, this detected PID number is provided to a Video Transport Processor (VTP). Then, in a block 1070, a command structure is parsed accordingly. This may be performed using the VTP. It is also noted that with this option, firmware flow is disturbed to accommodate handling of such PID numbers.

A second option:

In this option, the PID number of the TP/TS formatted command packet is the same as the video PID number, as shown in a functional block 1055. If desired in this situation, the command packet contains an Adaptation Field only and no payload, as shown in a functional block 1057. Then, in a block 1065, the command structure is placed in a private field of the adaptation field. Then, a signature uniquely identifies this packet as a TP/TS formatted command packet in a block 1075. A 32-bit signature may be used in certain embodiments. In addition, a continuity_counter of the TP/TS formatted command packet is ignored as shown in a block 1077 within the functional block 1075.

Some other considerations may be implemented to perform this second option as well, as follows for example.

The field structure of the TP/TS formatted command packet is shown in the table below. All the Video related command/parameter fields are explained in the next section.

| FIELD | NO OF BITS | VALUE |
|---|---|---|
| SYNC_BYTE | 8 | 47H |
| TRANSPORT_ERROR_INDICATOR | 1 | 0 |
| PAYLOAD_UNIT_START_INDICATOR | 1 | 0 |
| TRANSPORT_PRIORITY | 1 | 0 |
| PID | 13 | VIDEO_PID in Hex |
| TRANSPORT_SCRAMBLING_CONTROL | 2 | 00B |
| ADAPTATION_FIELD_CONTROL | 2 | 10B |
| CONTINUITY_COUNTER | 4 | X |
| ADAPTATION_FIELD_LENGTH | 8 | 183D |
| ADAPTATION_FLAG | 8 | 02H or 82H |
| TRANSPORT_PRIVATE_DATA_LENGTH | 8 | 15D |
| ALIGN_BYTE | 8 | 0 |
| SIGNATURE_32BITS | 32 | 4252434DH |
| MODE | 32 | MODE |
| SKIP_COUNT | 32 | SKIP_COUNT |
| DISPLAY_COUNT | 32 | DISPLAY_COUNT |
| PICTURE_START_PACKET | 32 | PICTURE_START_PACKET |
| PICTURE_START_BYTE | 32 | PICTURE_START_BYTE |
| PICTURE_END_PACKET | 32 | PICTURE_END_PACKET |
| PICTURE_END_BYTE | 32 | PICTURE_END_BYTE |
| DISCARD_HEADEND | 32 | DISCARD_HEADEND |
| DISCARD_TAILEND | 32 | DISCARD_TAILEND |
| DXPORT_VALUE | 32 | DXPORT_VALUE |
| STUFFING_BYTE | 132 bytes | XX |

Exemplary field structure of the TP/TS formatted command packet

Some notes regarding the field structure set forth in the above table:

The structure of the TP/TS formatted command packet follows the syntax of MPEG 2 Transport Header.

XX means don't care. Such fields are not considered by the Video transport for TP/TS formatted command packet.

The 32-bit signature 0x4252434d is the ASCII value of "BRCM".

The PICTURE_START_PACKET and PICTURE_START_BYTE represent i and j of the field PICTURE_START denoted by $TPB_{i,j}$.

The PICTURE_END_PACKET and PICTURE_END_BYTE represent i and j of the field PICTURE_END denoted by $TPB_{i,j}$.

A TP/TS formatted command packet comes prior to the packet containing the corresponding PICTURE_START. The command in a TP/TS formatted command packet is valid over all the pictures given by the command and all the packets given by the PICTURE_START and PICTURE_END fields. This means that a TP/TS formatted command packet can be encountered by the Video Transport before the count provided by the previous TP/TS formatted command packet.

Figure 10:
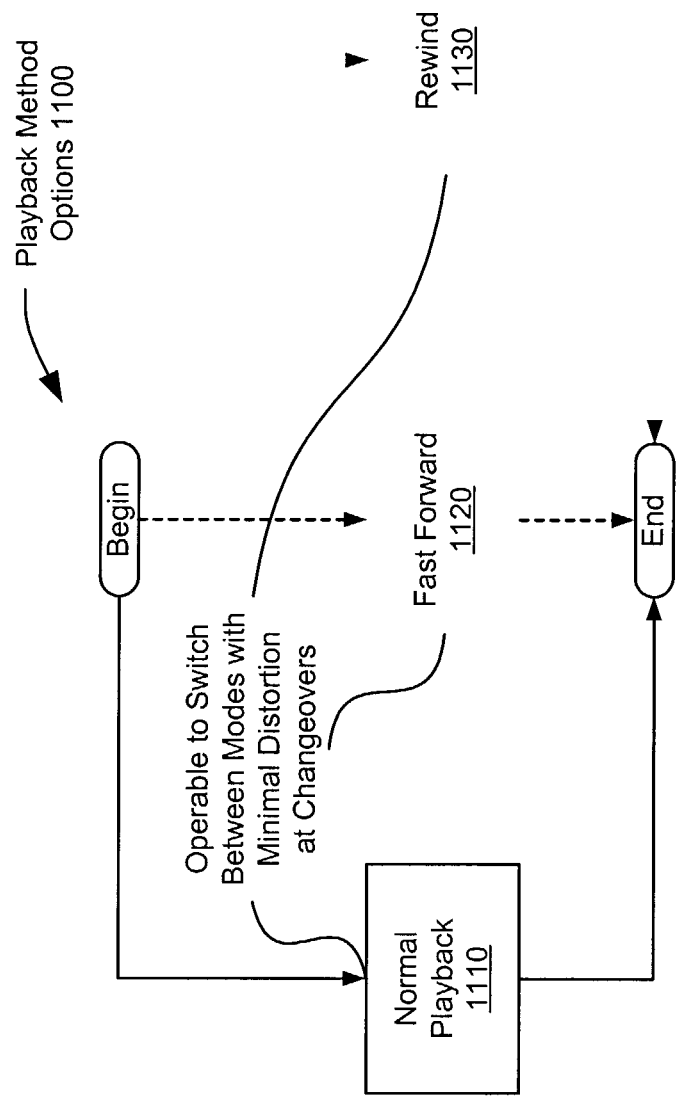
FIG. 10 is a functional block diagram illustrating an embodiment of playback method options that may be performed in accordance with certain aspects of the present invention.

FIG. 10 is a functional block diagram illustrating an embodiment of playback method options 1100 that may be performed in accordance with certain aspects of the present invention. The playback that may be performed using aspects of the present invention essentially fall into three different modes, Normal playback 1110, Fast Forward 1120, and Rewind 1130. A user is generally able to switch between these modes with minimal distortions at changeovers. During Playback, a CPU reads the data from the hard disk and places it in Playback buffers in the DRAM belonging to the chip. The CPU operates on segments of the elementary stream (ES) from one Entry Point (EP) picture to the other. It determines the EP picture by inspecting the two bytes following the start code value (SCV).

Figure 11:
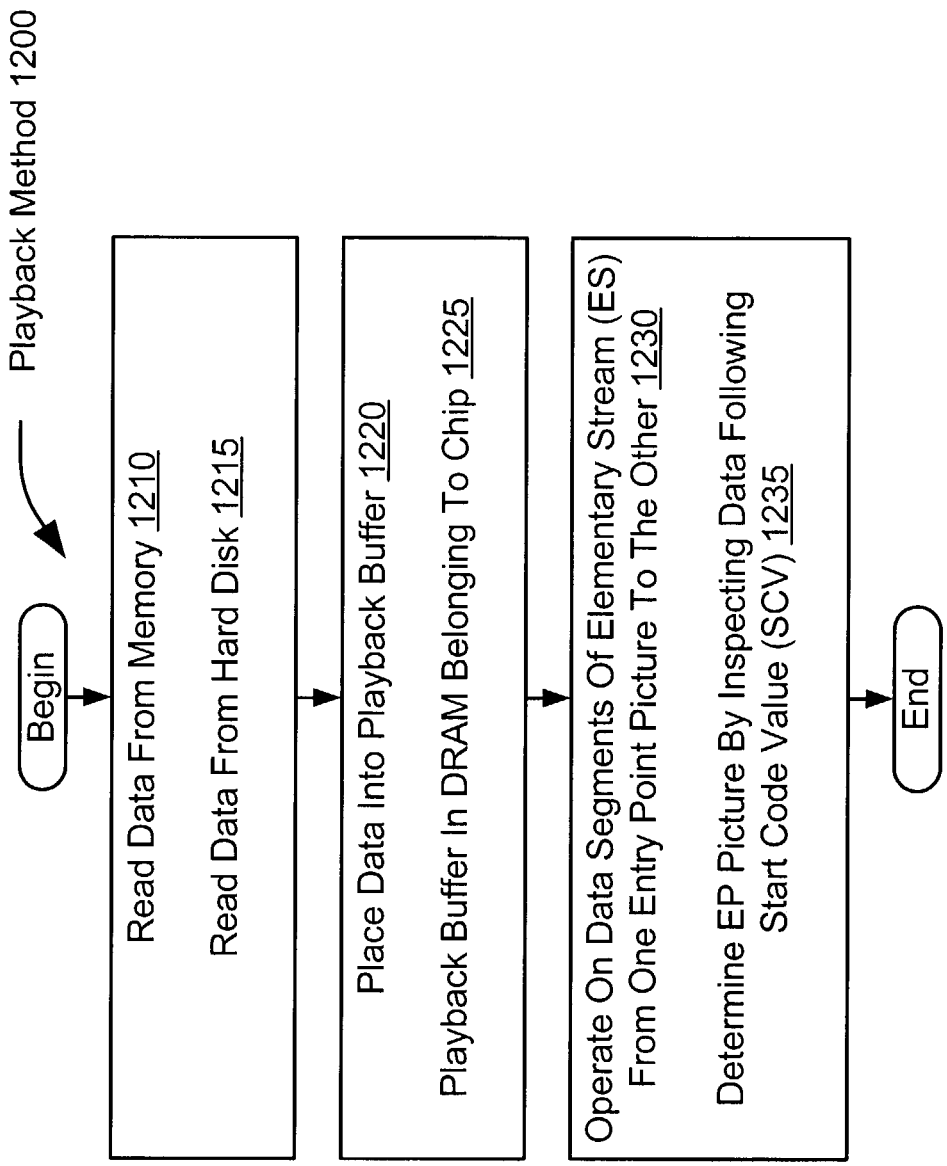
FIG. 11 is a functional block diagram illustrating an embodiment of a playback method that is performed in accordance with certain aspects of the present invention.

FIG. 11 is a functional block diagram illustrating an embodiment of a playback method 1200 that is performed in accordance with certain aspects of the present invention. During Playback, data is read from memory in a block 1210. This reading of data is from the hard disk in certain embodiments. Then, in a block 1220, the data is placed in a playback buffer. These playback buffers are in the DRAM belonging to the chip, as shown in a block 1225 in certain embodiments. Then, in a block 1230, the data segments of the elementary stream (ES) from one entry point (EP) picture to the other EP picture of the data segment. Moreover, the determination of the EP picture is made by inspecting the two bytes following the start code value (SCV) as shown in a block 1235.

Figure 12:
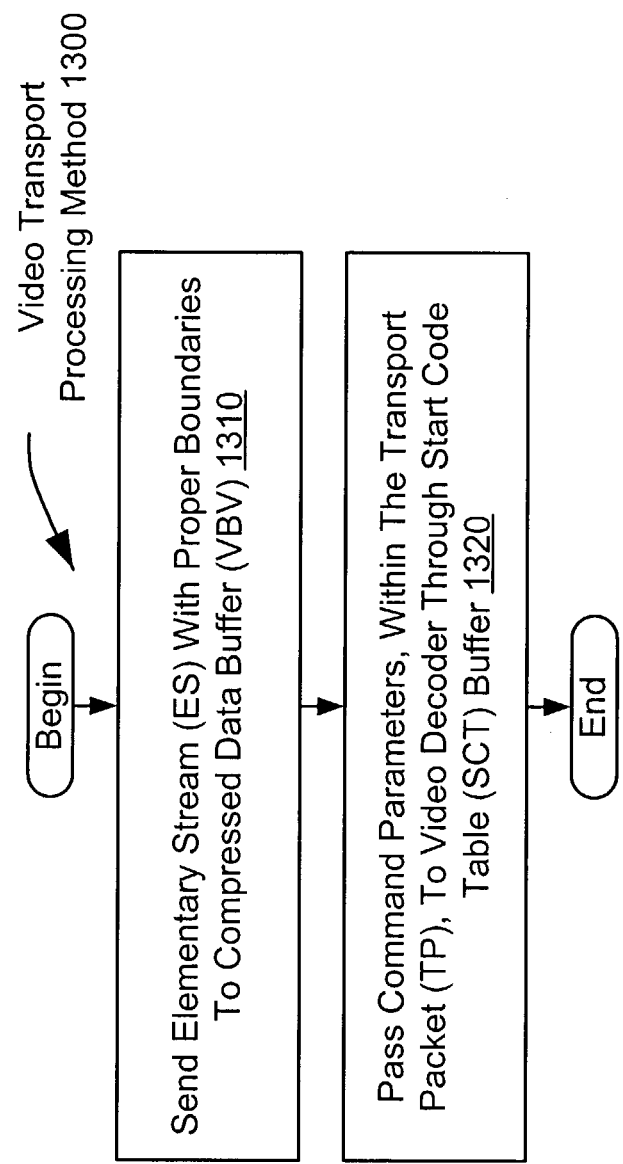
FIG. 12 is a functional block diagram illustrating an embodiment of a video transport processing method that is performed in accordance with certain aspects of the present invention.

FIG. 12 is a functional block diagram illustrating an embodiment of a video transport processing method 1300 that is performed in accordance with certain aspects of the present invention. In the Transport based Progressive Refresh Stream, the Video Transport Processor is responsible for sending the elementary stream (ES) with proper boundaries to the VBV (compressed data buffer). This may be described as shown in a block 1310 where an elementary stream (ES) with the proper boundaries is sent to the VBV (compressed data buffer). It also passes some of the command parameters in the TP/TS formatted command packet to the MPEG Video Decoder through a start code table (SCT) Buffer. This may be described as shown in a functional block 1320. It is also noted that this SCT buffer should not be confused with the SCIT generated in the data transport.

The data flow of the Playback stream is described below in the following Figures and disclosure during the different modes of operation. The following exemplary notations are presented to assist in explaining the data flow of a TS in accordance with certain aspects of the present invention.

$EP_m$ denotes the $m^{th}$ Entry Point Picture, where m is an integer, that represents an arbitrary entry point.

$P_{m,n}$ denotes $n^{th}$ Picture after $m^{th}$ Entry Point Picture, where m and n are integers.

$EP_m$ to $EP_{m+1}$ form segment m, $EP_{m+1}$ to $EP_{m+2}$ form segment m+1 and so on $TPB_{i,j}$ means the Transport Packet Byte at an offset j from byte zero in the transport packet ii from the current packet. This will be used extensively for pointing to a start code and the packet containing it from the TP/TS formatted command packet.

The following commands are given by the Data Transport to the Video Transport Processor through the TP/TS formatted command packet. The command is applicable for all the pictures following this TP/TS formatted command packet till the picture pointed by the next TP/TS formatted command packet. Here, a "command" means the concatenation of all the following fields.

MODE: This field gives the following commands to the Video Transport and the Decoder

00 PLAY
01 DISPLAY
02 BUILD_REFERENCE
03 PROCESS
04 DISCARD_TILL_BTP

PLAY: This command puts the Video Decoder in the normal mode. The pictures following this command are treated as any normal stream by the decoder.

DISPLAY: This command puts the Video Decoder in the display mode. For a given picture sequence, the Video Decoder decodes all the pictures but displays only the last of the "displayable" picture BUILD_REFERENCE: This command puts the Video Decoder in the decode mode. For a given segment, the Video Decoder builds a reference picture. A reference picture has all the slices decoded cleanly. Pictures coming after the reference picture in the display order can use it for doing "valid" predictions.

PROCESS: This command causes the Video Transport to process DISCARD_HEADEND and DISCARD_TAILEND only. The SKIP_COUNT and DISPLAY_COUNT fields are not sent to the Video Decoder. This command is meant for Video Transport.

But note that the DISCARD_HEADEND and DISCARD_TAILEND fields are processed for all the above commands.

DISCARD_TILL_BTP: This causes the Video Transport to discard only the video ES data bytes starting from the transport packet that follows till the next BTP for that PID. When this field is zero, the Video Transport does not discard ES till the next BTP.

SKIP_COUNT: This field specifies the number of pictures to be skipped before sending a picture to display. Using the Play command with a skip count of 1 achieves a fast forward (FF) of ×2. If the picture to be skipped is a B picture, it is also skipped from processing.

DISPLAY_COUNT: This field specifies the number of displayable pictures starting from the picture that follows the TP/TS formatted command packet for which the corresponding command has to be used.

Typically,
  this field will be "0" for BUILD_REFERENCE mode
  this field will be "1" for Rewind mode
  this field will be equal to number of pictures in an EP segment in the normal playback mode
  this field will be equal to (int) ((number of pictures in an EP segment)/(skip_count+1))

PICTURE_START: This field informs the location of the start of the first picture following a TP for which the command has to be applied, by pointing to the first byte of the start code sequence from the start of the packet in which it is present. This is represented by $TPB_{i,j}$.

PICTURE_END: This field informs the location of the start of a picture following a TP/TS formatted command packet over which the command has to be applied. This means the command is valid for all the pictures starting from the PICTURE_START till the picture preceding the one indicated by this field. This is represented by $TPB_{i,j}$ and gives first byte of the start code sequence from the start of that packet.

DISCARD_HEADEND: This enables the Video Transport to discard all the bytes from the start of the payload till the offset mentioned in this field. A value of 0 means no byte has to be discarded.

This field is useful in case of Fast Forward and for decoding the sequence header DISCARD_TAILEND: This enables the Video Transport to discard all the bytes from the offset mentioned in this field till the end of the packet. A value of 0 means no byte has to be discarded.

This field is useful in case of Fast Forward and for decoding the sequence header.

DXPORT_VALUE: The value in this field is used for piggybacking in the one of the non-slice entry in the SCV table. During the trick mode changes, the Video Decoder returns this value whenever the data transport driver calls a get(DXPORT_VALUE) function. This value could be a PTS value or an offset in the SCIT table. This ensures a quick response during the trick mode changes.

It is also noted that a "command" is applicable over all the pictures present between PICTURE_START and PICTURE_END. Again, the command may be extracted from a TP/TS formatted command packet.

Figure 13:
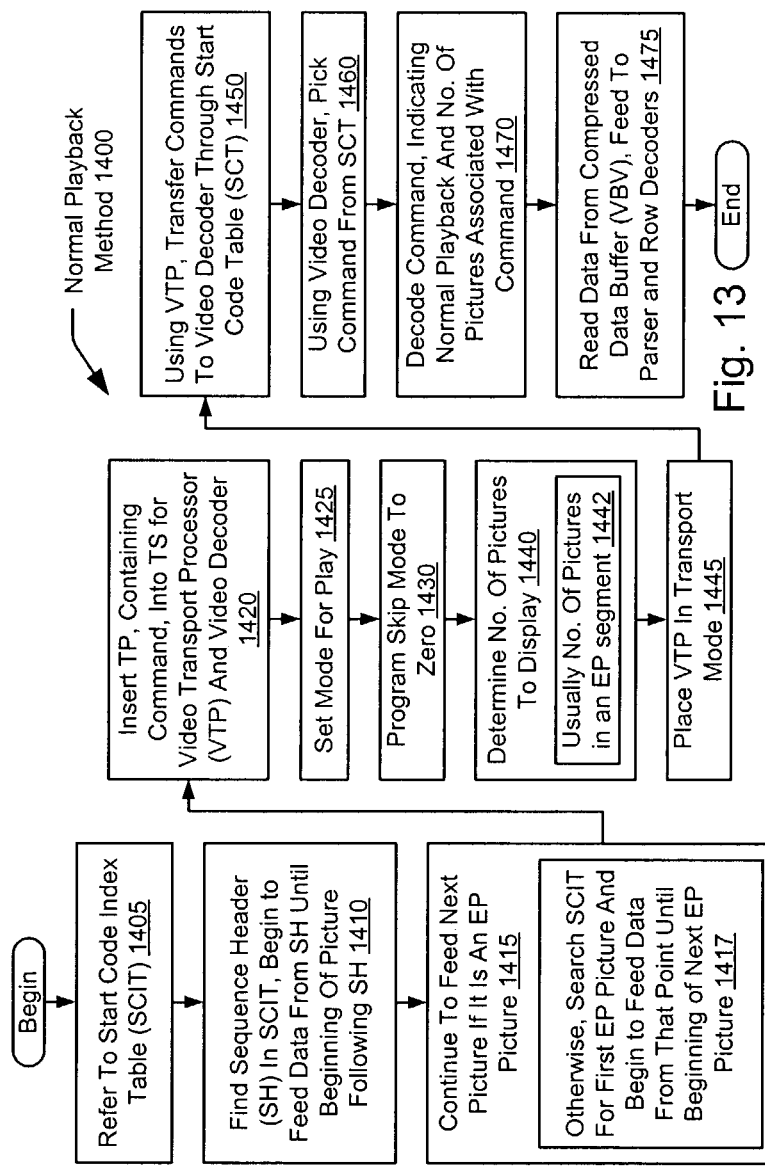
FIG. 13 is a functional block diagram illustrating an embodiment of a normal playback method that is performed in accordance with certain aspects of the present invention.

FIG. 13 is a functional block diagram illustrating an embodiment of a normal playback method 1400 that is performed in accordance with certain aspects of the present invention. Now, using the general mechanism and the commands listed above, the normal playback method 1400 may be achieved in the following manner. In a block 1405, a CPU refers to the start code index table (SCIT) that it had picked during the record function. Then, in a block 1410, the CPU finds a Sequence Header (SH) in the SCIT and begins to feed the data from that Sequence Header until the beginning of the picture following the Sequence Header.

If the next picture is an entry point (EP) picture, then it continues to feed the data from that picture as shown in a block 1415. However there is an exception. If the first picture after the Sequence header and the corresponding extensions is not an EP picture, then the CPU searches the SCIT for the first EP picture and begins feeding data from that point till the beginning of the next EP picture as shown in a block 1417 within the functional block 1415.

In a block 1420, the CPU also inserts a TP/TS formatted command packet (containing the command) for the Video Transport Processor and the video decoder. The Mode is set for PLAY in a block 1425, and the SKIP_COUNT is programmed to zero in a block 1435. Then, in a block 1440, the DISPLAY_COUNT field informs the number of pictures to be displayed. Typically, this value is the number of pictures in an EP segment as shown in a block 1442. Then, the Video Transport Processor is placed in the Transport Mode in a block 1445. The Video Transport Processor transfers the commands to the video decoder through the start code table (SCT) in a block 1450. The Video decoder then picks a command from the Start Code Table (SCT) buffer 1460. The command is then decode in a block 1470, and the command tells the video decoder that it is Normal Playback, and then this would also give the number of pictures that the command has been issued for. Ultimately, the Compressed Data Buffer (VBV) Manager is kicked off to read data from the VBV and feed it to the Parser and the Row Decoders as shown in a block 1475.

It is also noted that wherever a mention is made of the CPU sending the pictures, it is assumed that it starts from the transport packet starting with the PES that contains the picture. Using the PICTURE_START and PICTURE_END fields, the Video Transport will get to the right byte of the elementary stream in the transport packets.

The Video Transport Processor is responsible for extracting from the Transport packets and sending the ES with proper boundaries to the VBV (compressed data buffer). It also passes the Video related commands/parameters in the TP to the MPEG VIDEO DECODER through SCT Buffer (this should not be confused with the SCIT generated in the data transport) for the video decoder. The Video Transport Processor gets to the start and end of a picture by looking at the PICTURE_START and PICTURE_END fields, both of which, are represented by $TPB_{i,j}$.

Figure 14:
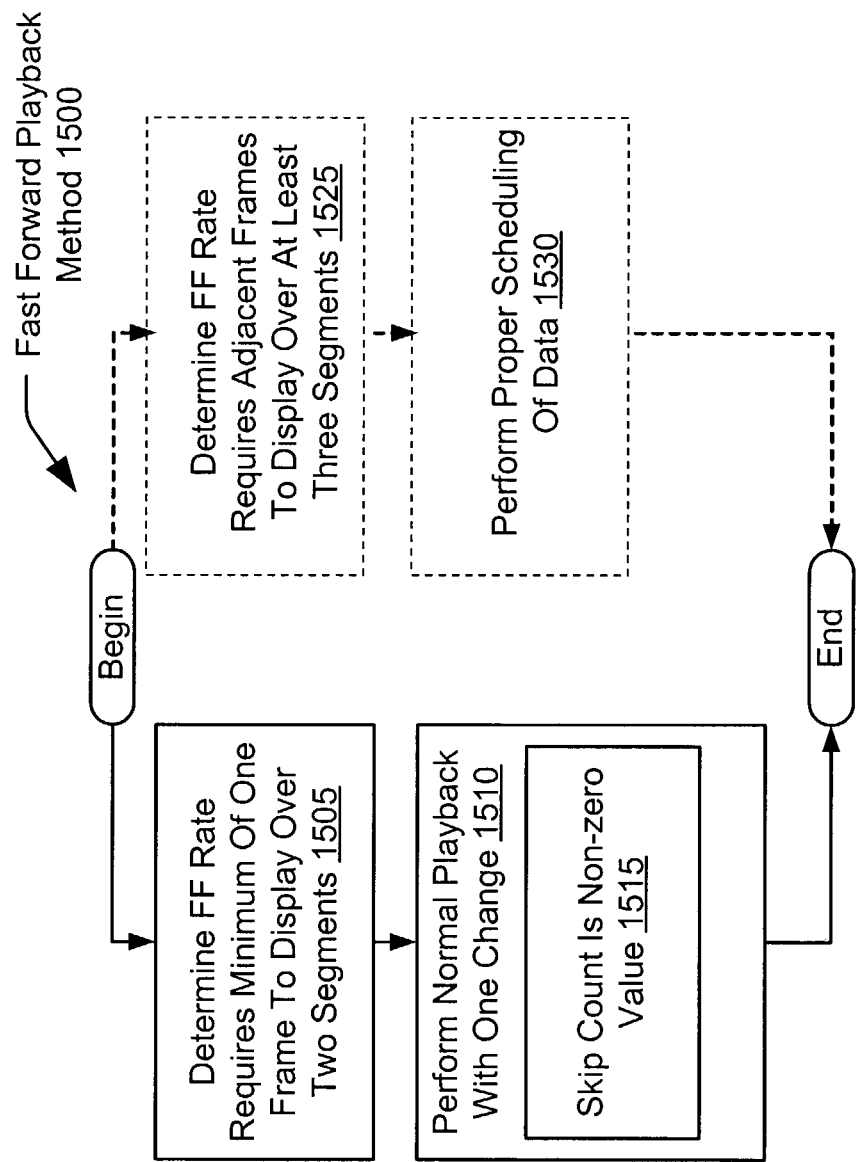
FIG. 14 is a functional block diagram illustrating an embodiment of a fast forward playback method that is performed in accordance with certain aspects of the present invention.

FIG. 14 is a functional block diagram illustrating an embodiment of a fast forward playback method 1500 that is performed in accordance with certain aspects of the present invention. There are many modes in which fast forward (FF) may be performed in accordance with the present invention. Two potential cases will be described below in the FIG. 14.

A first option is a mode in which the fast forward rate is such that there is a minimum of one frame to display over two segments as shown in a block 1505. In this case as shown in a block 1510, the CPU does not do anything different compared to the normal playback as far as feeding the data is concerned. One change, however, is that the SKIP_COUNT is a non-zero value as shown in a block 1515. A value of 1 causes the Video Decoder to drop every other picture from the display process, achieving a Fast Forward rate of ×2.

A second option is a mode in which the fast forward rate is such that the adjacent pictures are placed over a minimum of three segments as shown in a block 1525. In this case, the CPU does some scheduling of the data as shown in a block 1530.

For example, if a picture $P_{m,n}$ is to be displayed, a reference picture is built by feeding the segment between $EP_{m-1}$ to $EP_m$. The CPU needs to configure video in BUILD_REFERENCE mode. The SKIP_COUNT needs to be programmed to x−1 and DISPLAY_COUNT needs to be 0, where x is the total number of pictures in the segment.

The CPU then feeds the pictures $P_{m,0}$ to $P_{m,n}$ in the segment from $EP_m$ to $EP_{m+1}$, which is to be used for the actual decode and display. The video has to be configured in PLAY mode. The CPU programs the DISPLAY_COUNT to 1 and the SKIP_COUNT with n−1 to display the picture $P_{m,n}$.

This second mode or case of fast forward is similar to the rewind, which is described in detail below.

Figure 15:
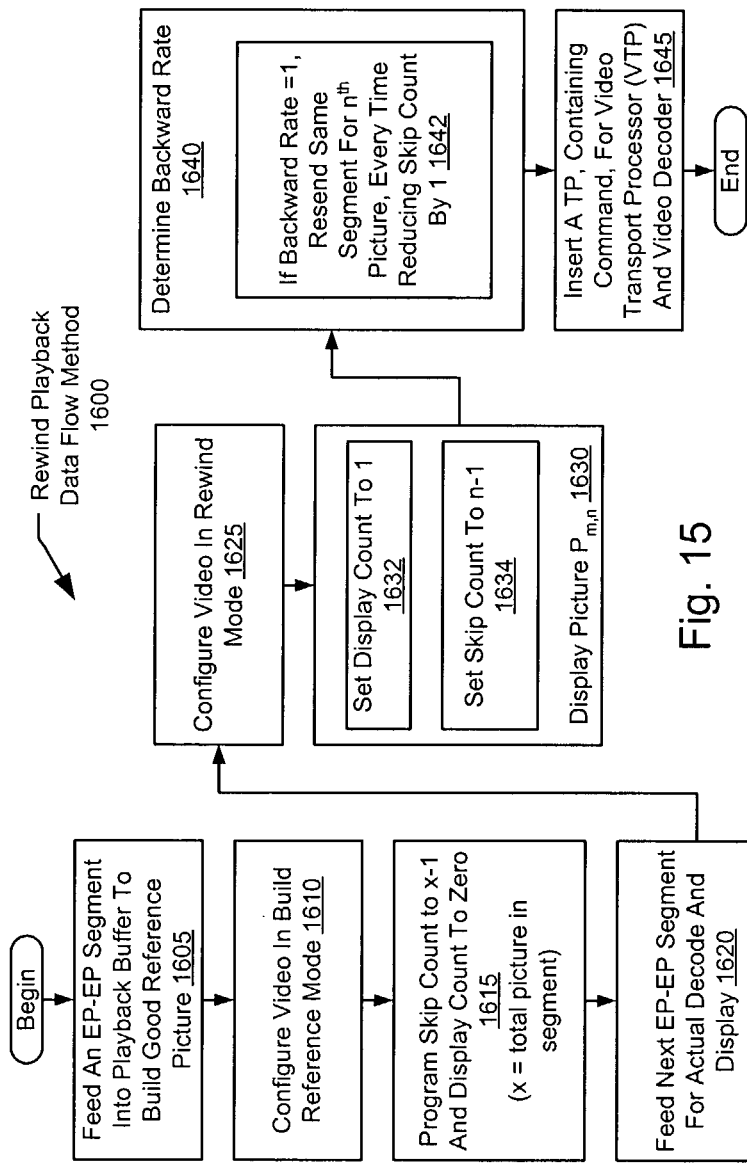
FIG. 15 is a functional block diagram illustrating an embodiment of a rewind playback data flow method that is performed in accordance with certain aspects of the present invention.

FIG. 15 is a functional block diagram illustrating an embodiment of a rewind playback data flow method 1600 that is performed in accordance with certain aspects of the present invention. During rewind, the CPU plays a major role in scheduling the data in the correct order. In order to correctly decode and display a particular frame, it is important that all the pictures before it were indeed created using "good" data. Since progressive refresh streams have no I pictures, but are progressively refreshed, the CPU first feeds an EP-EP segment into the Playback Buffers to build a good reference picture as shown in a block 1605. Then, the CPU needs to configure the video in BUILD_REFERENCE mode as shown in a block 1610.

In a block 1615, the SKIP_COUNT is programmed to x−1 and DISPLAY_COUNT needs to be 0, where x is the total number of pictures in the segment. The CPU then feeds the next EP-EP segment, which is to be used for the actual decode and display, as shown in a block 1620. The CPU configures the video in REWIND mode s shown in a block 1625. Then, in a block 1630, the picture $P_{m,n}$ is displayed. The DISPLAY_COUNT is set to 1 in a block 1632 and the SKIP_COUNT is set to n−1 in a block 1634 to display the picture $P_{m,n}$.

Then, in a block 1640, the backward rate of the rewind data flow is determined. If the CPU desires to go backwards at a ×1 rate (in a block 1642), then it resends the same segment that it supplied for the $n^{th}$ picture, every time reducing the SKIP_COUNT fields value by one (1). The CPU also inserts a TP/TS formatted command packet (containing the command) for the Video Transport Processor and the video decoder.

Figure 16:
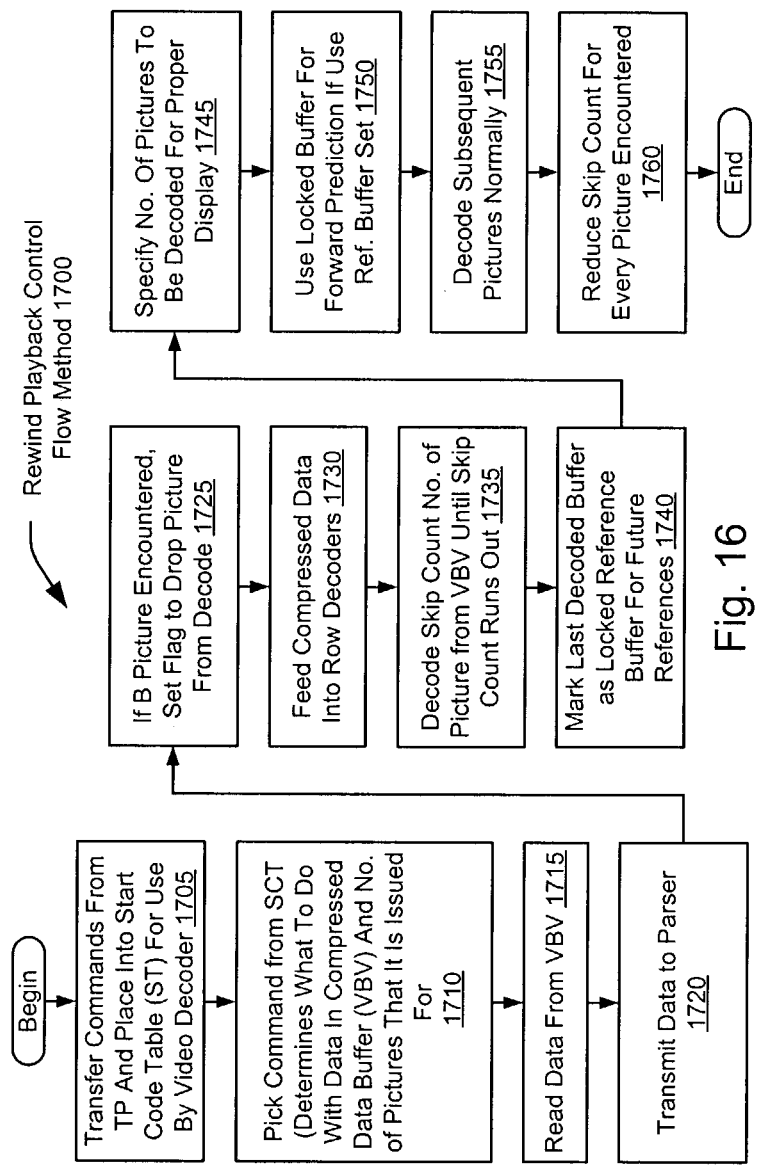
FIG. 16 is a functional block diagram illustrating an embodiment of a rewind playback control flow method that is performed in accordance with certain aspects of the present invention.
Figure 17:
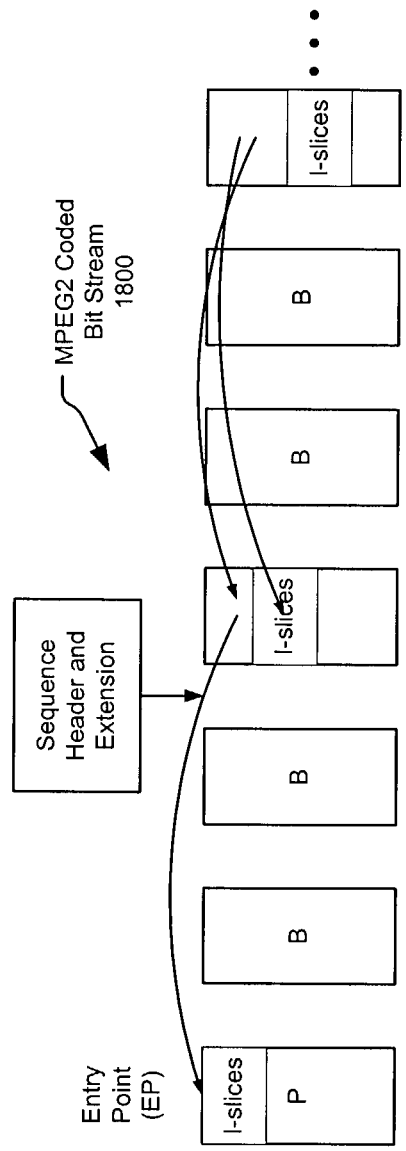
FIG. 17 is a system diagram illustrating an embodiment of an MPEG-2 coded bit stream that is configured in accordance with certain aspects of the present invention.

FIG. 16 is a functional block diagram illustrating an embodiment of a rewind playback control flow method that is performed in accordance with certain aspects of the present invention. In a block 1705, the Video Transport Processor transfers the commands from the TP/TS formatted command packet and places it in the Start Code Table (SCT) for use by video decoder. Then, in a block 1710, the Video decoder picks the command from the SCT and decides what to do with the data in the compressed data buffer (VBV). The command tells the video decoder that it is Rewind Build (using BUILD_REFERENCE, for example). The command also gives the number of pictures that it has been issued for in the block 1710.

Then, in a block 1715, the VBV Manager is kicked off to read data from the VBV. In a block 1720, the data is fed to a Parser. Since this is a REFERENCE_BUILD, the Buffer manager does not push any picture into the Display Queue. In a block 1725, if a B picture is encountered, the Buffer Manager sets a flag to indicate to the VBV manager to drop that picture from Decode. The VBV manager begins to start feeding the compressed data to the Row Decoders in a block 1730. The buffer manager uses all the three/four buffers in the BUILD_REFERENCE mode.

Then, in a block 1735, the Video decoder decodes the SKIP_COUNT number of pictures from the VBV. Once the SKIP_COUNT runs out, the last buffer that was used for decode is marked as "LockedReferenceBuffer" for future references in a block 1740. This Special lock is over and above the common "locked for decode" that exists in the design today. When the Video Decoder is configured in the REWIND command, the video decoder reads compressed data from the VBV to generate one displayable picture.

Then, in a block 1745, the command specifies the number of pictures that are to be decoded in order to display the desired picture. The Buffer Manager uses the "Locked" buffer as the buffer for Forward Prediction if it finds the 'UseReferenceBuffer' SET in a block 1750. It also clears the Flag so that it does not get used again for that Command session.

In a block 1755, all subsequent pictures are decoded normally, and the buffers that are used for Forward and Backward predictions are constantly updated. The buffer manager is careful not to overwrite the Locked Reference Buffer. In the Three buffers mode, since one of the buffers is Locked, the other two are used for the decoding of the I/P pictures and the B pictures are discarded. In the four buffer mode, the B pictures that are intended for Display are only decoded.

In a block 1760, the skip count is reduced for every picture that the Buffer Manager encounters. If a B picture is encountered, then the skip count is reduced and a flag is set to indicate the VBV manager to skip that picture. If the skip count becomes zero on a picture, then that picture is displayed. In the four buffer scheme, if that picture is a B picture, then that picture is decoded and displayed. However, in the three buffer mode, then there is not a buffer into which that B picture can be decoded, as one of the buffers is the Locked Reference frame and the other two are carrying the current I/P Forward and Backward prediction reference frames. In such a scenario, the previously decoded picture, (the current Backward prediction buffer) is pushed for display queue.

Below an example is described to illustrate the operation of certain aspects of the present invention that are described above in the various embodiments of the present invention.

For example, if the pictures to be displayed are $P_{m,n}$, $P_{m,n-1}$, $P_{m,n-2}$, $P_{m,n-3}$ and so on, following sequence is followed:

A reference picture is built by feeding the segment between $EP_{m-1}$ to $EP_m$. To achieve this, the CPU is configures video in BUILD_REFERENCE command. The DISPLAY_COUNT is programmed to 0 and SKIP_COUNT to x−1, where x is the total number of pictures in the segment.

The CPU then feeds the pictures from $P_{m,0}$ to $P_{m,n}$ in the segment from $EP_m$ to $EP_{m+1}$, which is used for the actual decode and display. The CPU configures video in the REWIND mode. The DISPLAY_COUNT should generally be programmed to 1 and SKIP_COUNT to n−1 to display the picture $P_{m,n}$.

Similarly, the CPU again feeds the pictures from $P_{m,0}$ to $P_{m,n-1}$ in the segment from $EP_m$ to $EP_{m+1}$, which is to be used for the actual decode and display time. Again, the CPU needs to configure video in REWIND mode. But, this time, the DISPLAY_COUNT should generally be programmed to 1 and SKIP_COUNT to n−2 to display the picture display the picture $P_{m,n-1}$. The above process is repeated, decreasing the SKIP_COUNT, till the picture $P_{m,0}$ is displayed.

The decoding of the sequence headers is described below. From the SCIT, the CPU knows the packet that contains the sequence header. The CPU can send only the sequence header data to the video by sending a TP before the packet containing the sequence header. This TP could contain the command that instructs the Video Transport Processor to discard the bytes between Transport Header and the PICTURE_START and/or to discard the bytes starting from the start code following the Sequence header till the end of the packet. The DISCARD_HEADEND and the DISCARD_TAILEND field are programmed accordingly.

For example, if a packet contains sequence header starts from byte offset 10 and the start code following it (and if this start code is not of interest at this point) starts at byte offset 150, the DISCARD_HEADEND and DISCARD_TAILEND should generally be programmed to 10 and 150 respectively. As long as the TP that follows next contains valid values, the other fields in this TP can have any value. The video is put in PROCESS mode.

Figure 18:
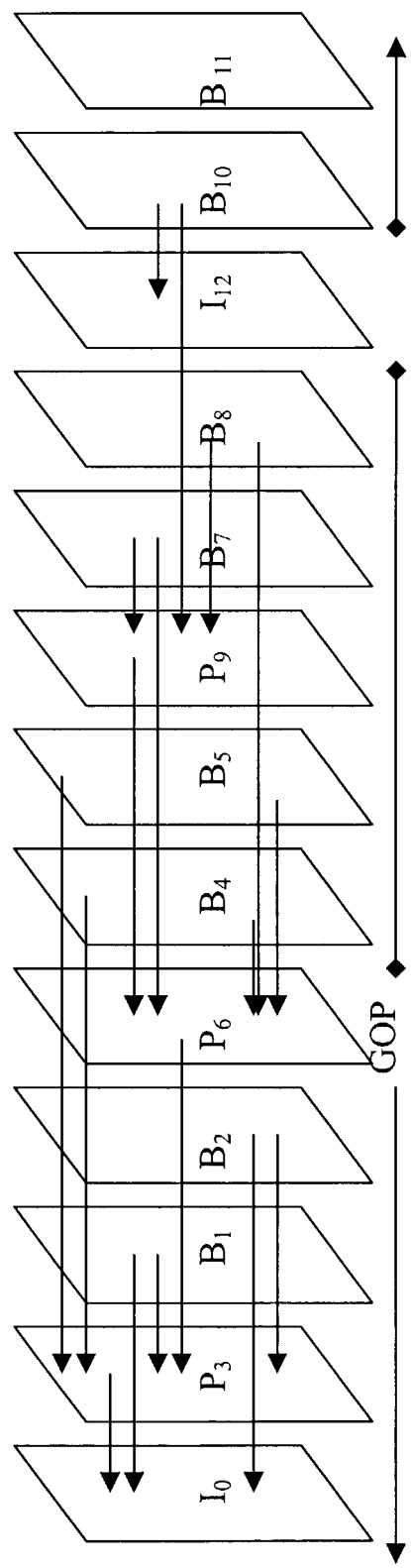
FIG. 18 is a block diagram of an exemplary series of picture in the forward decode order.

Referring now to FIG. 18, there is illustrated a block diagram of an exemplary series of pictures in the forward decode order. The temporal order is indicated by the subscript. The data dependence of each picture is illustrated by the arrows. For example, picture $B_2$ is dependent on pictures $I_0$ and $P_3$. Pictures coded using temporal redundancy with respect to only earlier pictures in the display order are known as predicted pictures (or P-pictures), for example picture $P_3$. Pictures coded using temporal redundancy with respect to earlier and later pictures of the video sequence are known as bi-directional pictures (or B-pictures), for example, pictures $B_1$ and $B_2$. Pictures that are not coded using temporal redundancy are known as I-pictures, for example $I_0$.

The foregoing data dependency among the pictures generally requires decoding of certain pictures prior to others. Additionally, the use of later pictures in the display order to decode previous pictures, generally requires that the later pictures in display order be decoded prior to the previous picture. As a result, the pictures are not decoded in temporal order. Accordingly, the pictures are decoded in the order of data dependence. For example, picture $B_2$ is dependent on $P_3$. Therefore, picture $P_3$ is received prior to $B_2$. The foregoing is referred to as decode order.

During normal playback, video decoders store the last two decoded I/P pictures in memory. The last I/P picture is used for predicting a P-picture and the last two pictures are used for predicting B-pictures. The foregoing memory is referred to as a frame buffer. Conventional video decoders typically have three buffers. The first and second frame buffers are used to store the last two decompressed I/P pictures and the third frame buffer used to build the present picture.

During a rewind operation, the pictures are displayed in the reverse order. The foregoing can be accomplished by receiving and decoding the I picture, e.g., $I_0$ and each P-picture, e.g., $P_3$, $P_6$, $P_9$, preceding, in the forward decode order, the picture for display, for each picture in the rewind sequence. The table below illustrates the sequence of decoders for rewinding the pictures in FIG. 18, starting from $B_8$.

| Display Picture | Decoded Pictures |
| --- | --- |
| $B_8$ | $I_0$, $P_{3, P6, P9}$ |
| $B_7$ | $I_0$, $P_{3, P6, P9}$ |
| $P_6$ | $I_0$, $P_3$ |
| $B_5$ | $I_0$, $P_{3, P6}$ |
| $B_4$ | $I_0$, $P_{3, P6}$ |
| $P_3$ | $I_0$ |
| $B_2$ | $I_0$, $P_3$ |
| $B_1$ | $I_0$, $P_3$ |
| $I_0$ | $I_0$ |

As can be seen from the table, the picture $I_0$ is decoded for each picture in the GOP. To avoid repeated decoding of $I_0$, $I_0$ can be stored as a reference picture in an additional frame buffer at the video decoder 745, referred to as the reference picture frame buffer. The pictures are displayed in reverse order by grouping the pictures into groups of pictures (GOPs). Each GOP includes a reference picture, e.g., the I-picture, and each picture that is data dependent on the reference picture. Prior to displaying the pictures of the GOP in the reverse order, the reference picture is stored in a reference picture frame buffer. Each picture of the GOP is displayed by decoding the pictures between the reference picture and the picture for display. By storing the reference picture in the frame buffer, the reference picture only has to be decoded one time for all of the pictures in the GOP. Additionally, it is also noted that in another embodiment, pictures from a later GOP can continue to use $I_0$.

Figure 19:
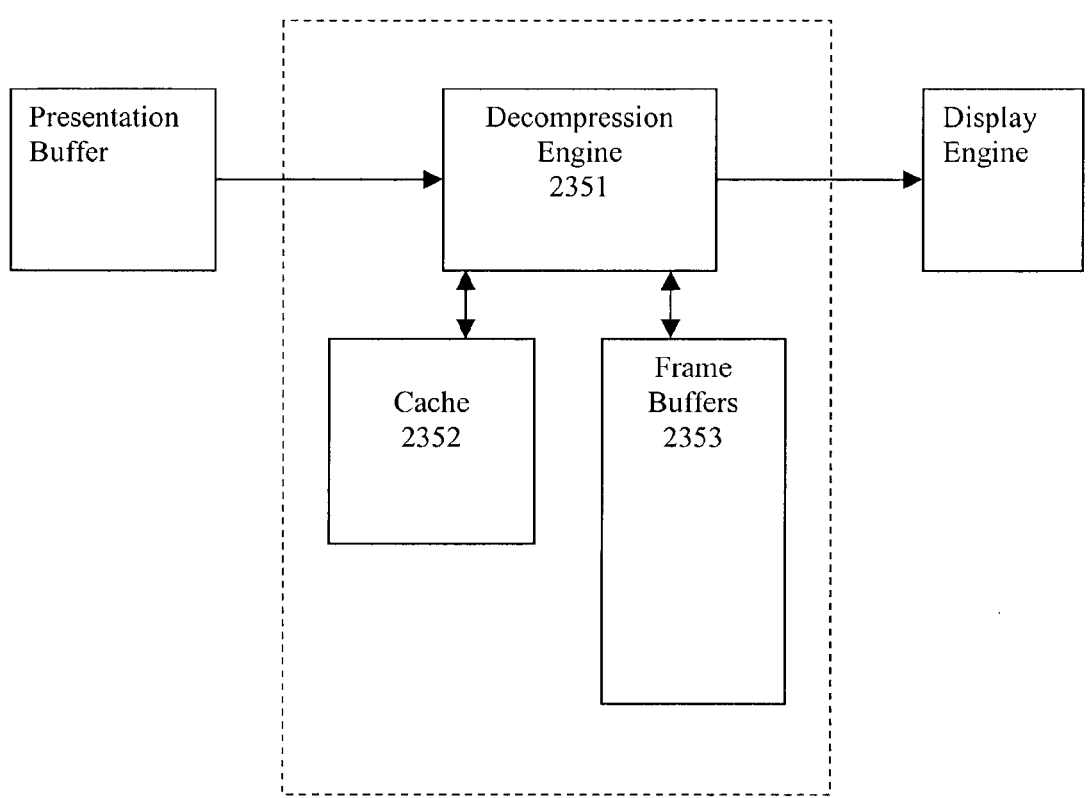
FIG. 19 is a block diagram of an exemplary video decoder in accordance with an embodiment of the present invention.

Referring now to FIG. 19, there is illustrated a block diagram of an exemplary video decoder 745 in accordance with an embodiment of the invention. The video decoder receives pictures form a presentation buffer and decodes the pictures for display. The decoded pictures for displaying are provided to the display engine. The video decoder 745 includes a decompression engine 2351, a cache memory 2352, and frame buffers 2353. The decompression engine 2351 and frame buffers 2353. The decompression engine 2351 performs the requisite decompression of received pictures, transforming the pictures into frames for display. As noted above, the pictures are data dependent from other pictures. Accordingly, the decompression engine 2351 stores past prediction pictures and future prediction pictures in the frame buffers 2353. Additionally, the decompression engine 2351 can store reference pictures in the frame buffers as well. While decoding pictures for display that are data dependent on the pictures stored in the frame buffers, the decompression engine 2351 uses the pictures stored therein to decode and provide the picture for display to the display engine 750. Additionally, the video decoder also includes a cache 2352 for storing pictures therein, to facilitate decoding pictures for display.

Referring again to FIG. 18, $B_7$ and $B_8$ are both dependent on the pictures $I_0$, $P_3$, $P_6$, and $P_9$. The pictures $B_7$ and $B_8$ can be decoded by transmitting a command packet to decode $I_0$, $P_3$, $P_6$, $P_9$, and $B_8$, and display $B_8$, followed by a command to decode $I_0$, $P_3$, $P_6$, $P_9$, and $B_7$, and display $B_7$. However, the foregoing repetitively decodes $I_0$, $P_3$, $P_6$, and $P_9$. To avoid repetitively decoding $I_0$, $P_3$, $P_6$, and $P_9$, the I frame is stored as a reference picture in a reference picture buffer, the P-pictures, e.g., $P_3$, $P_6$, and $P_9$, are decoded, and the pictures dependent thereon, e.g., $B_7$ and $B_8$ are decoded and displayed together.

Figure 20:
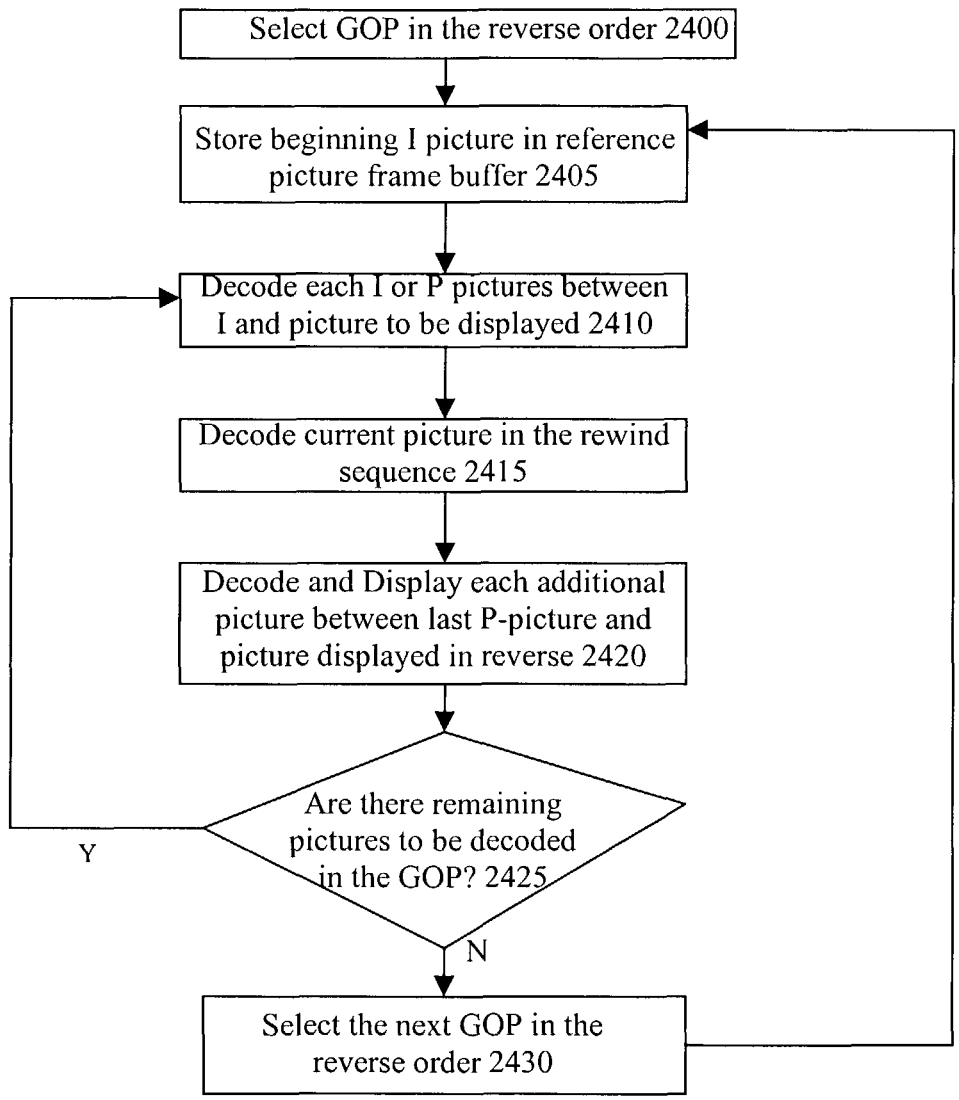
FIG. 20 is a flow diagram for displaying multiple pictures during a rewind operation in accordance with an embodiment of the present invention.

Referring now to FIG. 20, there is illustrated a flow diagram for displaying the pictures in reverse order in accordance with one embodiment of the present invention. The flow diagram will be described with reference to the pictures illustrated in FIG. 18. At 2400, the GOP in the reverse order is selected. At 2405, the beginning $I_0$ picture is stored in a reference picture frame buffer. At 2410, each of the I or P pictures between the $I_0$ and the picture to be displayed, e.g., $B_8$, are decoded, e.g., $P_3$, $P_6$, and $P_9$. During the 2410, the last two P-pictures, $P_6$ and $P_9$, are stored in frame buffers. Upon decoding the P-pictures $P_6$ and $P_9$, the current picture $B_8$ can be decoded, therefrom. At 2415, the current picture in the rewind sequence, $B_8$, is decoded and displayed. Additionally, upon decoding the P-pictures $P_6$ and $P_9$, each picture between the last P-picture, $P_9$, and $B_8$, in the forward decode order, e.g., $B_7$, can also be decoded. Accordingly, at 2420 each additional picture between the last P-picture to be decoded are decoded and displayed in reverse order. At 2425, if there are remaining pictures to be decoded in the GOP, 2410-2420 are repeated. If at 2425, all of the pictures have been displayed, the previous GOP in the reverse order is selected at 2430 and 2405-2425 are repeated.

In one embodiment, the foregoing can be implemented by insertion of command packets within the MPEG TS with appropriate TS formatted trick play commands 430 by a host processor, such as host processor 210/310. The trick play commands 430 can include commands that direct the video decoder 745 to store a reference picture in a reference picture frame buffer, decode multiple pictures and display multiple selected ones of the multiple pictures. For example, the following commands can be used for the indicated data:

| Data | Command |
| --- | --- |
| $I_0$ | Decode 1. Store as reference picture |
| $P_3 P_6 P_9 B_8 B_7$ | Decode 5 pictures, Display $B_8$, and then $B_7$ |

Although in the present illustration, an I-picture is used as the reference picture, the foregoing is applicable to HITS streams using the clean reference as the reference picture.

B-pictures use two prediction pictures to decode. One of these prediction pictures comes before the B-picture in the forward display order (known as the past prediction picture) and one of the prediction pictures comes after the B-picture in the forward display order (known as the future prediction picture). For example, with B-picture $B_8$, the past prediction picture is $P_6$, and the future prediction picture is $P_9$. Therefore, if all of the B-pictures that are dependent on the prediction pictures have been decoded, e.g., $B_7$ and $B_8$, one of the prediction buffers of the video decoder contains the past prediction picture, $P_6$, that actually comes after the B-pictures in the rewind order. The present invention proposes displaying the past prediction picture $P_6$ immediately after displaying the B-pictures. This completely avoids decoding the picture $P_6$ that has to be displayed after the B-picture.

Figure 21:
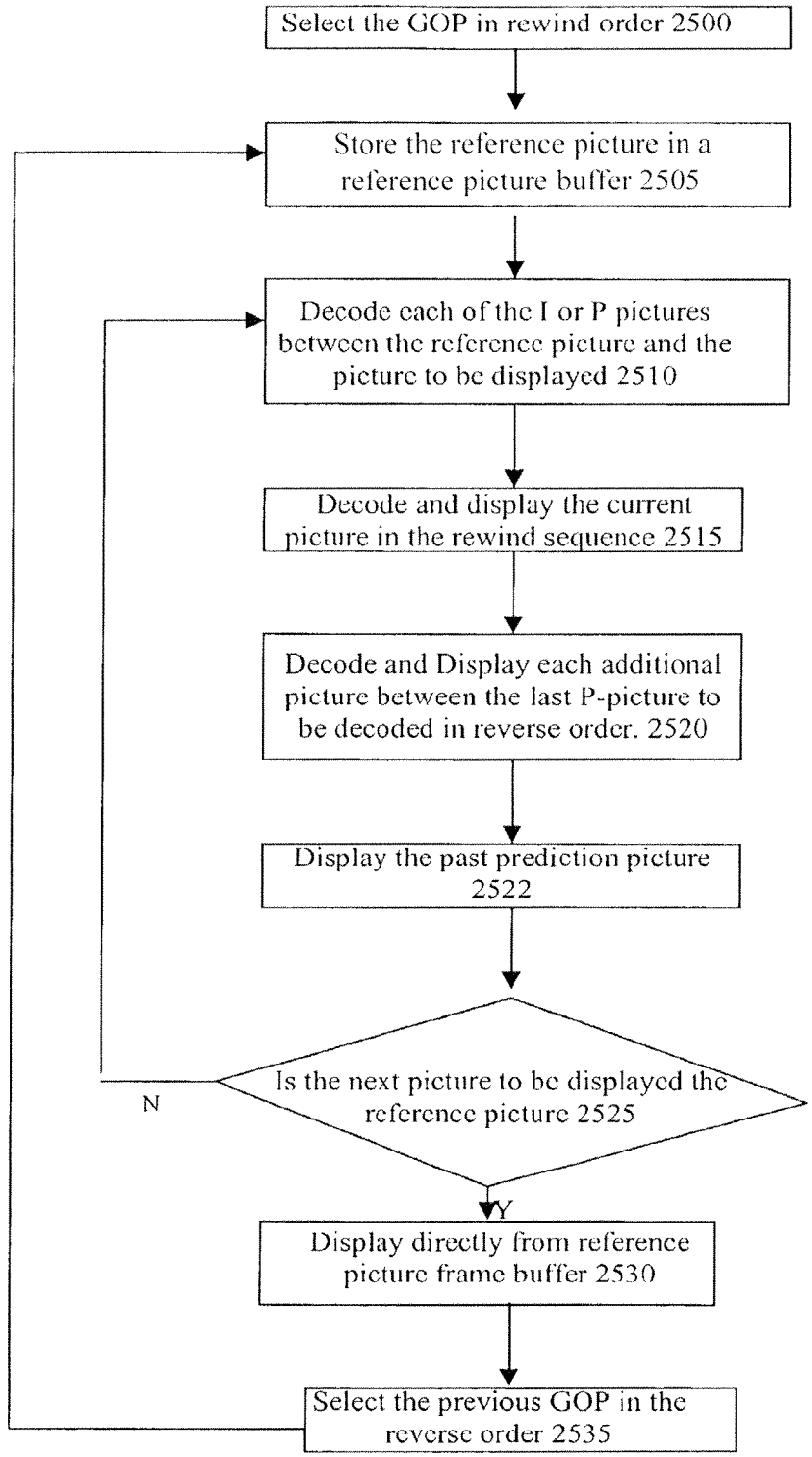
FIG. 21 is a flow diagram for displaying a past prediction picture during a rewind operation in accordance with an embodiment of the present invention.

Referring now to FIG. 21, there is illustrated a flow diagram for rewinding pictures in accordance with an embodiment of the present invention. At 2500, the GOP in the rewind order is selected. At 2505, the reference picture in the GOP, $I_0$ is stored as a reference picture in a reference picture buffer. At 2510, each of the I or P pictures between the $I_0$ and the picture to be displayed, e.g., $B_8$, are decoded, e.g., $P_3$, $P_6$, and $P_9$. During the 2510, the last two P-pictures, $P_6$ and $P_9$, are stored in frame buffers. Upon decoding the P-pictures $P_6$ and $P_9$, the current picture $B_8$ can be decoded, therefrom. At 2515, the current picture in the rewind sequence, $B_8$ is decoded and displayed. Additionally, upon decoding the P-pictures $P_6$ and $P_9$, each picture between the last P-picture, $P_9$, and $B_8$, in the forward decode order, e.g., $B_7$, can also be decoded. Accordingly, at 2520 each additional picture between the last P-picture to be decoded are decoded and displayed in reverse order. At 2522, the past prediction picture is displayed. At 2525, if the next picture to be displayed is not the reference picture, 2510-2522 are repeated. If at 2525, the next picture to be displayed is the reference picture, the reference picture is displayed directly from the reference picture frame buffer (2530), the previous GOP in the reverse order is selected at 2535, and 2505-2530 are repeated.

In one embodiment, the foregoing can be implemented by insertion of command packets within the MPEG TS with appropriate TS formatted trick play commands 430 by a host processor, such as host processor 210/310. The trick play commands 430 can include commands that direct the video decoder 745 to store a reference picture in a reference picture frame buffer, decode multiple pictures, display multiple selected ones of the multiple pictures, and display the past prediction picture directly from the frame buffer. For example, the following commands can be used for the indicated data:

| Data | Command |
| --- | --- |
| $I_0$ | Decode 1. Store as reference picture |
| $P_3 P_6 P_9 B_8 B_7$ | Decode 5 pictures, Display $B_8$, and then $B_7$ |
| | Decode none. Display Past prediction picture $P_6$ |
| $P_3 P_6 B_5 B_4$ | Decode 4 pictures, Display $B_5$, and then $B_4$. |
| | Decode none. Display Past prediction picture $P_3$ |
| $P_3 B_2 B_1$ | Decode 3 picture, Display $B_2$, and then $B_1$ |
| | Decode none. Display Reference picture $I_0$ |

Although in the present illustration, an I-picture is used as the reference picture, the foregoing is applicable to HITS streams using the clean reference as the reference picture.

Fast forward for streams having B-pictures is achieved by selectively not feeding the B-pictures. In an exemplary scheme, every alternate B-picture is dropped. No additional commands or parameters need to be inserted into the transport stream. Thus, if the stream has two B-pictures between P-pictures (denoted as a 2BP stream in parlance) then this scheme will achieve a 1.5× fast forward. Further, fast forward speed can be increased to 3× by dropping all B-pictures and displaying only I and P-pictures. For faster fast forward rates or for achieving an exact 2× rate, the TS commands scheme as described in FIG. 14 can be used, i.e., by building reference frames and feeding/decoding/displaying pictures from the reference picture.

During a fast forward operation, after a B-picture has been decoded, one of the prediction picture in the frame buffers contains the future prediction picture that actually comes after the B-picture in the forward display order. During a fast forward operation, the video stream is displayed in the forward display order, however, only the pictures at predetermined intervals are displayed. For example, a fast forward at 2× displays every second picture, e.g., $I_0, B_2, B_4, P_6, B_8 \ldots$. However, displaying every picture at a predetermined interval is not straightforward due to the data dependencies between pictures. During a 2× fast forward each of the pictures, $I_0, B_2, B_4, P_6, B_8$, and $B_{10}$ can be displayed by decoding $I_0$ and each P-picture between $I_0$ and the picture to be displayed. The pictures that are decoded to display each picture of the pictures illustrated in FIG. 18 at 2× are shown in the table below.

| Picture Displayed | Pictures Decoded for Prediction |
|---|---|
| $I_0$ | None |
| $B_2$ | $I_0, P_3$ |
| $B_4$ | $I_0, P_3, P_6$ |
| $P_6$ | $I_0, P_3$ |
| $B_8$ | $I_0, P_3, P_6, P_9$ |

As can be seen, there is a great deal of repetitive decoding. The repetitive decoding may be alleviated by storing the reference picture and by providing commands wherein the future prediction picture can be displayed directly from the frame buffer storing the future prediction picture. For example, $I_0$ is decoded for each picture. Additionally, $P_6$ is decoded for displaying $B_4$, and again decoded for display. The repetitive decoding of $I_0$ can be alleviated by storing $I_0$ as a reference picture in a reference picture frame buffer. Repetitious decoding of $P_6$ can be avoided by directly displaying the contents of the future frame buffer after displaying $B_4$.

Figure 22:
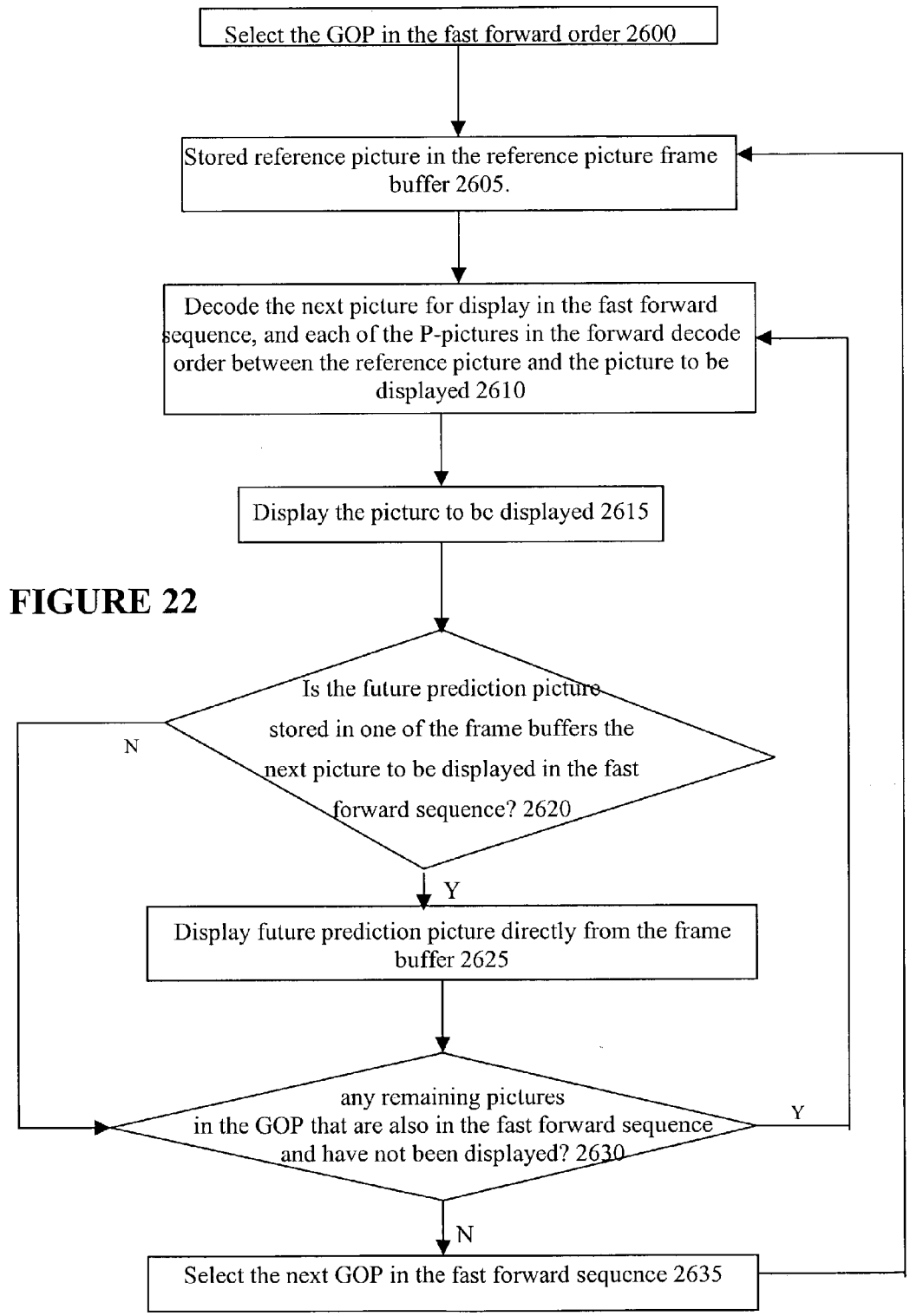
FIG. 22 is a flow diagram for displaying a future prediction picture during a fast forward operation in accordance with an embodiment of the present invention.

Referring now to FIG. 22, there is illustrated a flow diagram for a fast forward sequence. At 2600, the GOP in the fast forward order is selected, and a reference picture, e.g., $I_0$, is stored in the reference picture frame buffer at 2605. At 2610, the next picture for display in the fast forward sequence, and each of the P-pictures in the forward decode order between the reference picture and the picture to be displayed are decoded. At 2615, the picture to be displayed is displayed. At 2620, a determination is made whether the future prediction picture stored in one of the frame buffers is the next picture to be displayed in the fast forward sequence. If the future prediction picture stored in one of the frame buffers is the next picture to be displayed in the fast forward sequence, the future prediction picture is directly displayed from the frame buffer at 2625. If the future prediction picture stored in one of the frame buffers is not the next picture to be displayed in the fast forward sequence, 2625 is bypassed. At 2630, a determination is made whether there are any remaining pictures in the GOP that are also in the fast forward sequence and have not been displayed. If there are any remaining pictures in the GOP that are also in the fast forward sequence and have not been displayed, 2610-2625 are repeated. Otherwise the next GOP in the fast forward sequence is selected 2635, and 2605-2630 are repeated.

In one embodiment, the foregoing can be implemented by insertion of command packets within the MPEG TS with appropriate TS formatted trick play commands 430 by a host processor, such as host processor 210/310. The trick play commands 430 can include commands that direct the video decoder 745 to store a reference picture in a reference picture frame buffer, decode multiple pictures, display multiple selected ones of the multiple pictures, and display the future prediction picture directly from the frame buffer. For example, the following commands can be used for the indicated data:

| Data | Commands |
|---|---|
| $I_0$ | Decode 1. Store as reference picture |
| $P_3 B_2$ | Decode 2, Display only $B_2$ |
| $P_3 P_6 B_4$ | Decode 3, Display only $B_4$ |
| — | Decode none. Display the Future Prediction Picture ($P_6$) |

Further repetitive decoding can also be alleviated with the capability of making the past prediction picture the future prediction picture. For example, in order display $B_2$, $P_3$ is the future prediction picture. After displaying $B_2$, $B_4$ is displayed. For displaying $B_4$, $P_3$ is the past prediction picture, and $P_6$ is the future prediction picture. Although $P_3$ remains in a frame buffer, $P_3$ is again decoded. In accordance with an embodiment of the present invention, the foregoing is avoided by making the erstwhile future prediction picture as the current past prediction picture for the next picture to be displayed in the fast forward order.

Figure 23:
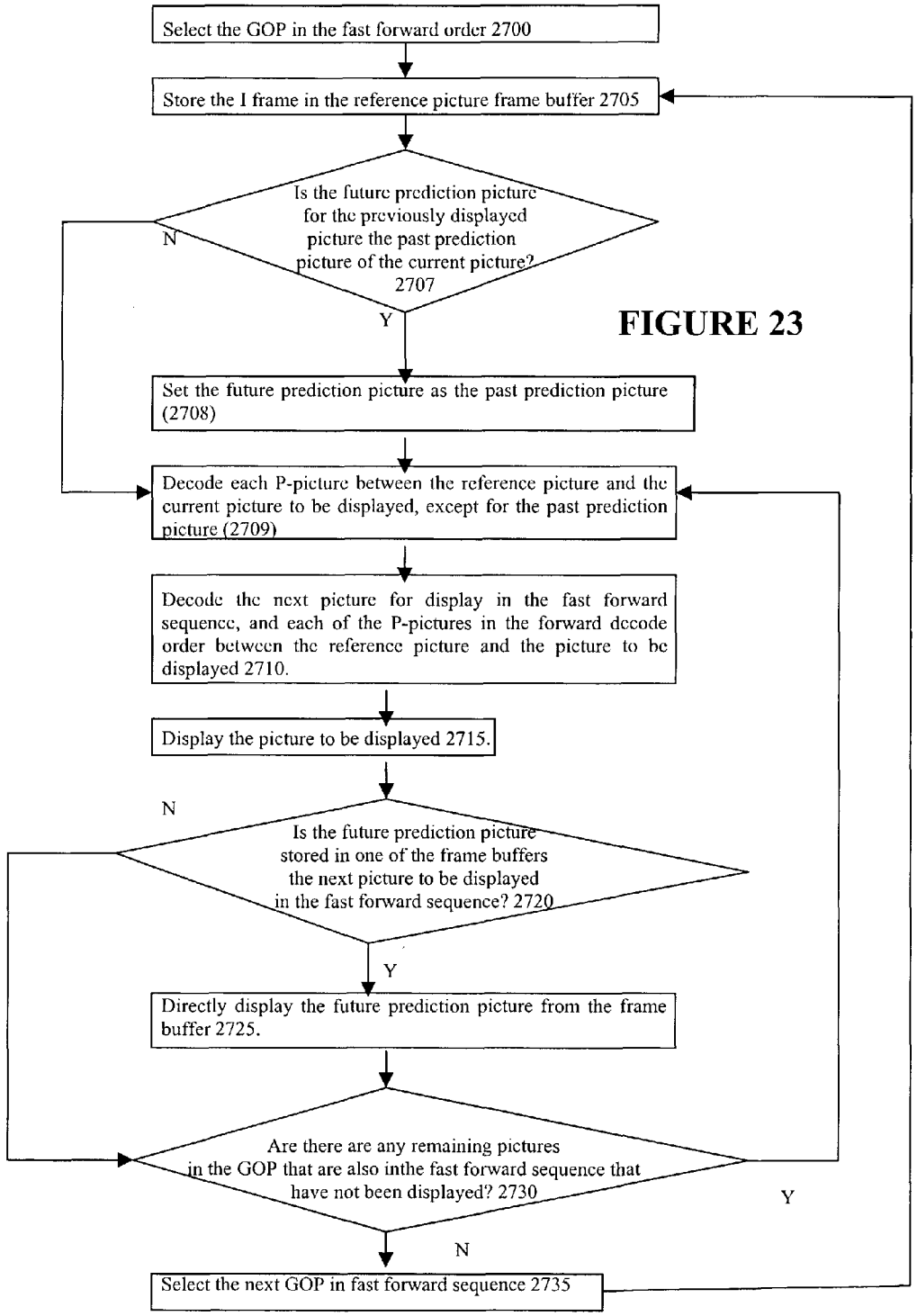
FIG. 23 is a flow diagram for setting the past prediction pictures as the future prediction during a fast forward operation in accordance with an embodiment of the present invention.

Referring now to FIG. 23, there is illustrated a flow diagram for displaying a fast forward sequence in accordance with an embodiment of the present invention. At 2700, the GOP in the fast forward order is selected, and the I frame, $I_0$ is stored in the reference picture frame buffer at 2705. At 2707, an examination is made whether the future prediction picture for the previously displayed picture is the past prediction picture of the current picture. If the future prediction picture of the previous picture is the past prediction picture the current picture in the fast forward sequence, the future prediction picture is set as the past prediction picture (2708) and each P-picture between this erstwhile future prediction (now the past prediction picture) and the current picture to be displayed are decoded (2709). If the future prediction picture of the previous picture is not the past prediction picture for the current picture, at 2710, the next picture for display in the fast forward sequence, and each of the P-pictures in the forward decode order between the reference picture and the picture to be displayed are decoded. At 2715, the picture to be displayed is displayed. At 2720, a determination is made whether the future prediction picture stored in one of the frame buffers is the next picture to be displayed in the fast forward sequence. If the future prediction picture stored in one of the frame buffers is the next picture to be displayed in the fast forward sequence, the future prediction picture is directly displayed from the frame buffer at 2725. If the future prediction picture stored in one of the frame buffers is not the next picture to be displayed in the fast forward sequence, 2725 is bypassed. At 2730, a determination is made whether there are any remaining pictures in the GOP that are also in the fast forward sequence and have not been displayed. If there are any remaining pictures in the GOP that are also in the fast forward sequence and have not been displayed, 2709-2730 are repeated. Otherwise the next GOP in the fast forward sequence is selected 2735, and 2705-2730 are repeated.

In one embodiment, the foregoing can be implemented by insertion of command packets within the MPEG TS with appropriate TS formatted trick play commands 430 by a host processor, such as host processor 210/310. The trick play commands 430 can include commands that direct the video decoder 745 to store a reference picture in a reference picture frame buffer, decode multiple pictures, display multiple selected ones of the multiple pictures, displaying the future prediction picture directly from the frame buffer, and/or making the past prediction picture the future prediction picture. For example, the following commands can be used for the indicated data:

| Data | Commands |
|---|---|
| $I_0$ | Decode 1. Store as reference |
| — | Decode none, Display $I_0$ through a command |
| $P_3 B_2$ | Decode 2. Display only $B_2$ |
| Move $P_3, P_6 B_4$ | Decode 2. Display $B_4$ (after making future $P_3$ as past and then decode $P_6$) |

Additionally, during a fast forward operation, it is also possible that the future prediction picture for a picture in the fast forward sequence is the reference picture for the next GOP. For example, for $B_{10}$, the past prediction picture is $P_8$ and the future prediction picture is $I_{12}$. However, $I_{12}$ is also the reference picture for the following GOP. Although $I_{12}$ can be decoded for displaying $B_{10}$ and decoded again as the reference picture for the following GOP, the foregoing is repetitious. Significant bandwidth and processing can be saved by avoiding decoding $I_{12}$ twice because I-pictures consume the largest amount of decoder bandwidth. To avoid decoding $I_{12}$ twice, a scheme for making the future prediction picture the reference picture is proposed.

Figure 24:
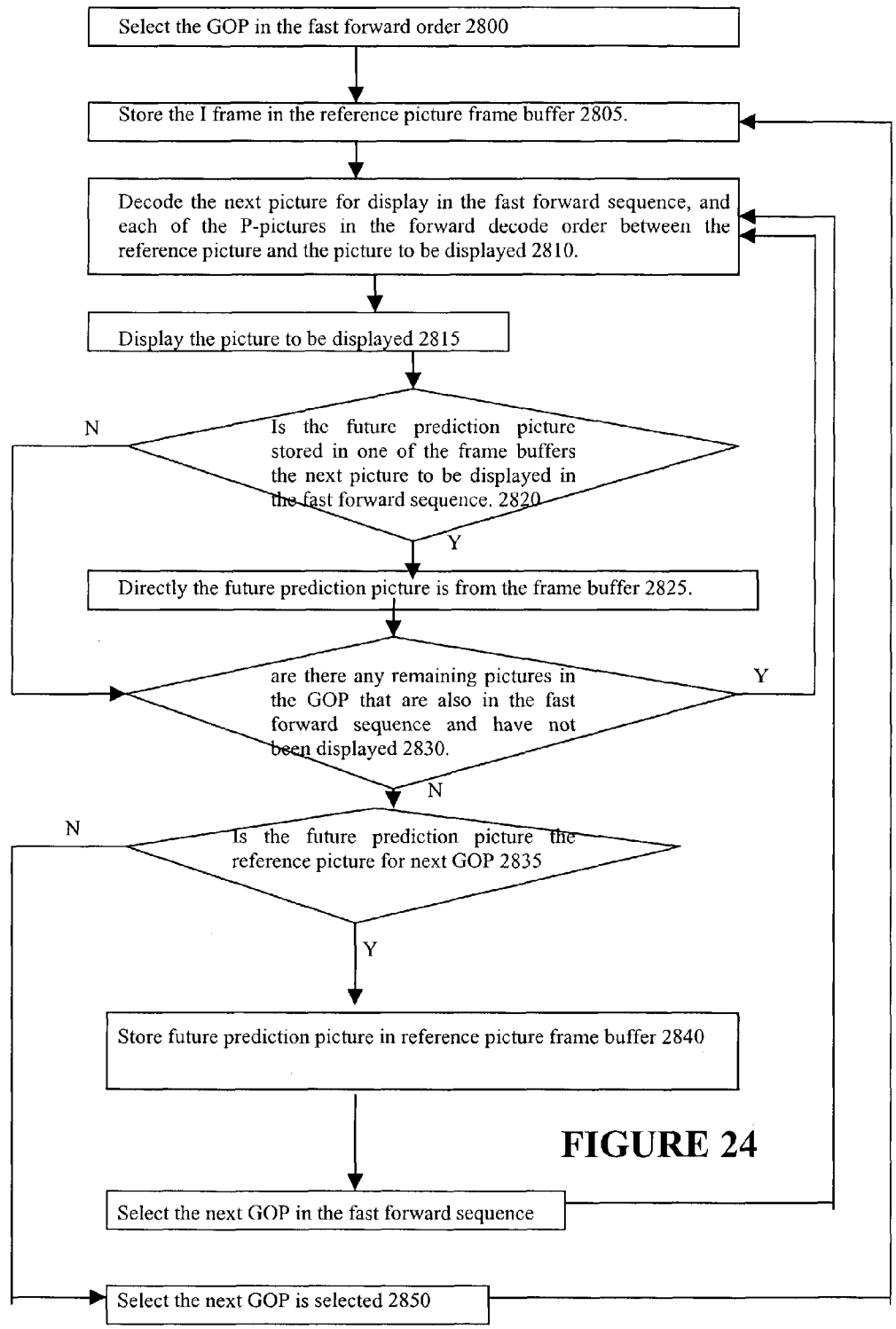
FIG. 24 is a flow diagram for making the future prediction picture the reference picture during a fast forward operation in accordance with an embodiment of the present invention.

Referring now to FIG. 24, there is illustrated a flow diagram for a fast forward sequence. At 2800, the GOP in the fast forward order is selected, and a reference picture, $I_0$, is stored in the reference picture frame buffer at 2805. At 2810, the next picture for display in the fast forward sequence, and each of the P-pictures in the forward decode order between the reference picture and the picture to be displayed are decoded. At 2815, the picture to be displayed is displayed. At 2820, a determination is made whether the future prediction picture stored in one of the frame buffers is the next picture to be displayed in the fast forward sequence. If the future prediction picture stored in one of the frame buffers is the next picture to be displayed in the fast forward sequence, the future prediction picture is directly displayed from the frame buffer at 2825. If the future prediction picture stored in one of the frame buffers is not the next picture to be displayed in the fast forward sequence, 2825 is bypassed. At 2830, a determination is made whether there are any remaining pictures in the GOP that are also in the fast forward sequence and have not been displayed. If there are any remaining pictures in the GOP that are also in the fast forward sequence and have not been displayed, 2810-2825 are repeated.

Otherwise a determination 2835 is made whether the future prediction picture is the reference picture for the next GOP. If the future prediction picture is the reference picture for the next GOP in the fast forward sequence, the future prediction picture is stored in the reference picture frame buffer (2840), the next GOP in the fast forward sequence is selected 2845, and 2810-2840 are repeated. If the future prediction picture is not the reference picture for the next GOP, the next GOP is selected 2850, and 2805-2840 are repeated.

In one embodiment, the foregoing can be implemented by insertion of command packets within the MPEG TS with appropriate TS formatted trick play commands 430 by a host processor, such as host processor 210/310. The trick play commands 430 can include commands that direct the video decoder 745 to store a reference picture in a reference picture frame buffer, decode multiple pictures, display multiple selected ones of the multiple pictures, display the past prediction picture directly from the frame buffer, and/or make the future prediction picture the reference picture. The commands can include the following for the indicated data:

| Data | Commands |
|---|---|
| $I_0$ | Store as reference |
| $P_3 B_2$ | Decode 2, Display $B_2$ |
| Move $P_3, P_6 B_4$ | Decode 3, Display $B_4$ (after making future $P_3$ to past) |
| — | Decode none. Display Future $P_6$ |
| Move $P_6, P_9 B_8$ | Decode 2, Display $B_8$ (after making future $P_6$ to past) |
| Move $P_9, I_{12}, B_{10}$ | Decode 4, Display $B_{10}$ (after making future $P_8$ to past) |
| — | Decode none. Store Future $I_{11}$ as reference. |

The personal video recorder system 200 as described herein may be implemented as a board level product, as a single chip, application specific integrated circuit (ASIC), or with varying levels of the system integrated on a single chip with other portions of the system as separate components. The degree of integration of the monitoring system may primarily be determined by speed of incoming MPEG packets, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory storing instructions is implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for decoding pictures, said method comprising:
    selecting a group of pictures in a rewind order, the group of pictures comprising a plurality of pictures;
    decoding a reference picture of the plurality of pictures;
    storing the decoded reference picture in a reference picture buffer, the reference picture buffer comprising a memory;
    displaying each additional picture of the plurality of pictures in the rewind order, the each additional picture being data dependent on the reference picture, the displaying of the each additional picture comprising:
        decoding each P-picture between the reference picture and the each additional picture to be displayed; and
        decoding the each additional picture based on the decoded reference picture stored in the reference picture buffer and the each decoded P-picture between the reference picture and the each additional picture to be displayed;
    determining that a next picture to be displayed is the reference picture; and
    displaying the reference picture directly from the reference picture buffer based on the determination that the next picture to be displayed is the reference picture.

2. The method of claim 1, wherein the reference picture is stored during displaying the each additional picture of the plurality of pictures.

3. An integrated circuit comprising:
    memory for storing a plurality of instructions;
    a processor connected to the memory;

wherein execution of the plurality of instructions by the processor causes:

selecting a group of pictures in a rewind order, the group of pictures comprising a plurality of pictures;

decoding a reference picture of the plurality of pictures;

storing the decoded reference picture in a reference picture buffer;

displaying each additional picture of the plurality of pictures in the rewind order, the each additional picture being data dependent on the reference picture, the displaying of the each additional picture comprising:

decoding each P-picture between the reference picture and the each additional picture to be displayed; and decoding the each additional picture based on the decoded reference picture stored in the reference picture buffer and the each decoded P-picture between the reference picture and the each additional picture to be displayed;

determining that a next picture to be displayed is the reference picture; and displaying the reference picture directly from the reference picture buffer based on the determination that the next picture to be displayed is the reference picture.

4. The integrated circuit of claim 3, wherein the reference picture comprises an intra-coded picture.

5. The integrated circuit of claim 3, wherein the reference picture is stored during displaying the each additional picture of the plurality of pictures.

6. A method for decoding pictures, the method comprising:

selecting a group of pictures in a fast forward order, the group of pictures comprising a plurality of pictures;

decoding a prediction picture of the plurality of pictures;

storing the decoded prediction picture in a frame buffer, the frame buffer comprising a memory;

displaying a next picture for display of the plurality of pictures in the fast forward order, the next picture for display being data dependent on the prediction picture, the displaying of the next picture for display comprising:

decoding each P-picture between the prediction picture and the next picture for display; and decoding the next picture for display based on the decoded prediction picture stored in the frame buffer and the each decoded P-picture between the prediction picture and the next picture for display;

determining that a second next picture for display is the prediction picture; and displaying the prediction picture directly from the frame buffer based on the determination that the second next picture for display is the prediction picture.

7. The method of claim 6, wherein the prediction picture comprises a past prediction picture.

8. The method of claim 6, wherein the prediction picture comprises a future prediction picture.

9. A video decoder for displaying pictures, said video decoder comprising:

a first frame buffer for storing a prediction picture;

a second frame buffer for storing a picture to be displayed;

a display engine for displaying the picture to be displayed; and a decompression engine configured to:

select a group of pictures in a fast forward order, the group of pictures comprising a plurality of pictures;

decode a prediction picture of the plurality of pictures;

store the decoded prediction picture in the first frame buffer;

cause the display engine to display a next picture for display of the plurality of pictures in the fast forward order from the second frame buffer, the next picture for display being data dependent on the prediction picture, the display of the next picture for display comprising:

decode each P-picture between the prediction picture and the next picture for display; and decode the next picture for display based on the decoded prediction picture stored in the first buffer and the each decoded P-picture between the prediction picture and the next picture for display;

determine that a second next picture for display is the prediction picture; and cause the display engine to display the prediction picture directly from the first frame buffer based on the determination that the second next second picture for display is the prediction picture.

10. The video decoder of claim 9, wherein the prediction picture comprises a past prediction picture.

11. The video decoder of claim 9, wherein the prediction picture comprises a future prediction picture.

12. The video decoder of claim 9, wherein the prediction picture comprises an intra-coded picture.

13. The video decoder of claim 12, wherein the prediction picture comprises a P-picture with at least one intra-coded slice.

* * * * *